(12) United States Patent
Baker et al.

(10) Patent No.: US 11,077,603 B1
(45) Date of Patent: Aug. 3, 2021

(54) METHOD OF PRODUCING A PACKAGING CONTAINER WITH A CLOSURE AND RELEASE MECHANISM AND RETENTION ELEMENTS

(71) Applicants: Jay Baker, Mayville, NY (US); Jessup Baker, Brocton, NY (US)

(72) Inventors: Jay Baker, Mayville, NY (US); Jessup Baker, Brocton, NY (US)

(*) Notice: Subject to any disclaimer, the term of this patent is extended or adjusted under 35 U.S.C. 154(b) by 0 days.

(21) Appl. No.: 16/826,496

(22) Filed: Mar. 23, 2020

(51) Int. Cl.
| | |
|---|---|
| B29C 51/08 | (2006.01) |
| B65D 1/22 | (2006.01) |
| B29C 51/30 | (2006.01) |
| B65D 43/16 | (2006.01) |
| B65D 1/40 | (2006.01) |
| A01M 23/16 | (2006.01) |
| B29C 51/26 | (2006.01) |
| B29C 51/44 | (2006.01) |
| B29L 31/00 | (2006.01) |
| B65D 43/26 | (2006.01) |

(52) U.S. Cl.
CPC ............. *B29C 51/30* (2013.01); *A01M 23/16* (2013.01); *B29C 51/08* (2013.01); *B29C 51/266* (2013.01); *B29C 51/44* (2013.01); *B65D 1/22* (2013.01); *B65D 1/40* (2013.01); *B65D 43/162* (2013.01); *B29L 2031/712* (2013.01); *B65D 43/26* (2013.01); *B65D 2251/1025* (2013.01)

(58) Field of Classification Search
CPC .............................. B29C 51/34; B29C 51/343
See application file for complete search history.

(56) References Cited

U.S. PATENT DOCUMENTS

| | | | | |
|---|---|---|---|---|
| 4,114,213 A | * | 9/1978 | Beernaerts | A47C 7/18 264/257 |
| 5,198,244 A | * | 3/1993 | Rice | B29C 33/48 425/383 |
| 5,766,536 A | * | 6/1998 | Felder | B29C 33/48 264/297.1 |
| 5,894,007 A | * | 4/1999 | Younessian | A45C 5/03 264/522 |
| 5,895,624 A | * | 4/1999 | Reece | B29C 51/14 264/163 |
| 6,261,504 B1 | * | 7/2001 | Baker | B29C 33/44 264/318 |
| 2001/0030384 A1 | * | 10/2001 | Baker | B29C 44/582 264/318 |
| 2006/0094578 A1 | * | 5/2006 | Dammers | B65D 15/08 493/87 |

(Continued)

*Primary Examiner* — Benjamin A Schiffman
(74) *Attorney, Agent, or Firm* — The Bilicki Law Firm, P.C.

(57) ABSTRACT

A process for manufacturing a container with a closure-release mechanism relates to thermoforming a plastic sheet to form a container with a clam shell locking system in order to facilitate a secure closure and easy opening packaging container. The clam shell locking arrangement comprises a post which is secured in an aperture when the container is in closed state. The post is a projection or protrusion in a vertical or nearly vertical sidewall of the cover of the thermoformed package and fits securely into the aperture, which is a cut-out made in the outer, and optionally also the inner, wall segments of the vertical or nearly vertical surfaces of the base section of the thermoplastic containers.

19 Claims, 29 Drawing Sheets

(56) References Cited

U.S. PATENT DOCUMENTS

| | | | |
|---|---|---|---|
| 2006/0113715 A1* | 6/2006 | Schwab | B29C 51/44 |
| | | | 264/523 |
| 2006/0220274 A1* | 10/2006 | Dooley | B29C 45/14196 |
| | | | 264/259 |
| 2007/0052135 A1* | 3/2007 | Habeger | B29C 51/34 |
| | | | 264/318 |
| 2013/0068370 A1* | 3/2013 | Harding | B29C 51/20 |
| | | | 156/69 |
| 2014/0370218 A1* | 12/2014 | Hawkins | B29C 51/00 |
| | | | 428/36.5 |
| 2016/0101560 A1* | 4/2016 | Knoll | B29C 51/34 |
| | | | 264/318 |
| 2018/0170629 A1* | 6/2018 | Phan | B65D 1/26 |
| 2018/0222633 A1* | 8/2018 | Baker | B65D 1/34 |
| 2019/0077066 A1* | 3/2019 | Lauth | B29C 51/34 |
| 2020/0039716 A1* | 2/2020 | Ferk | B65D 77/2084 |

* cited by examiner

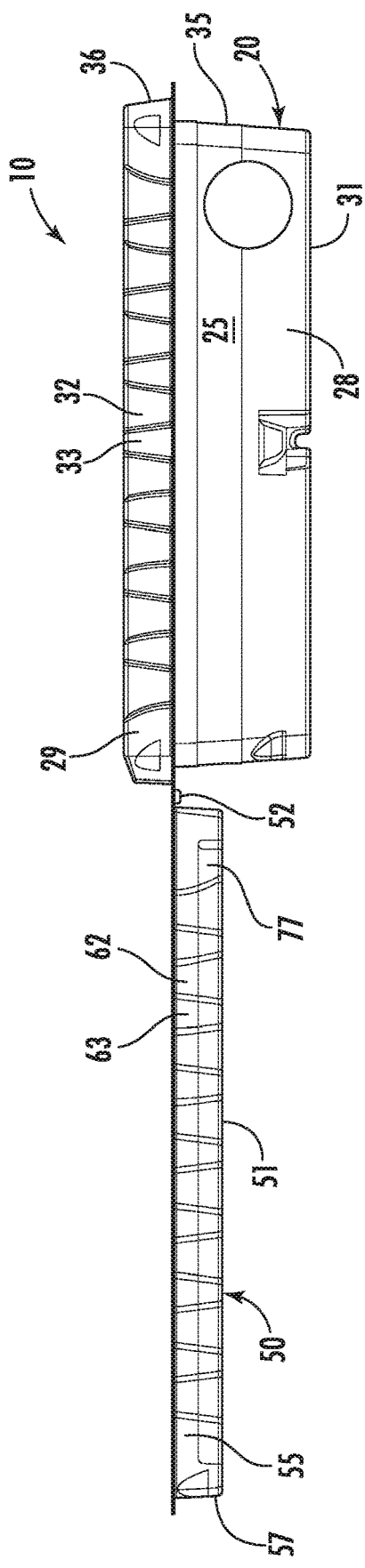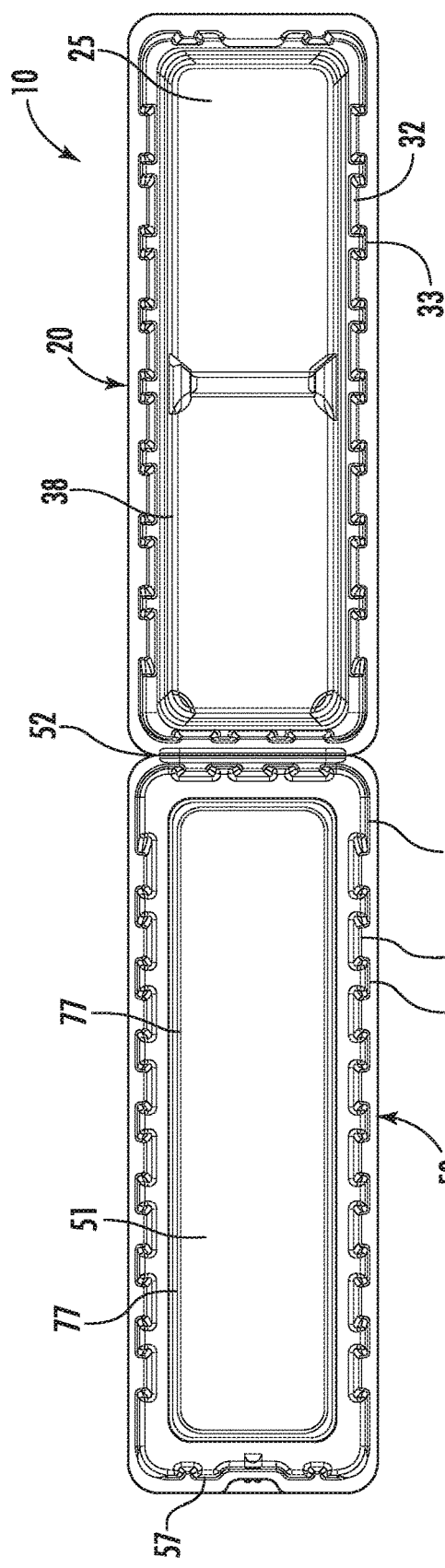

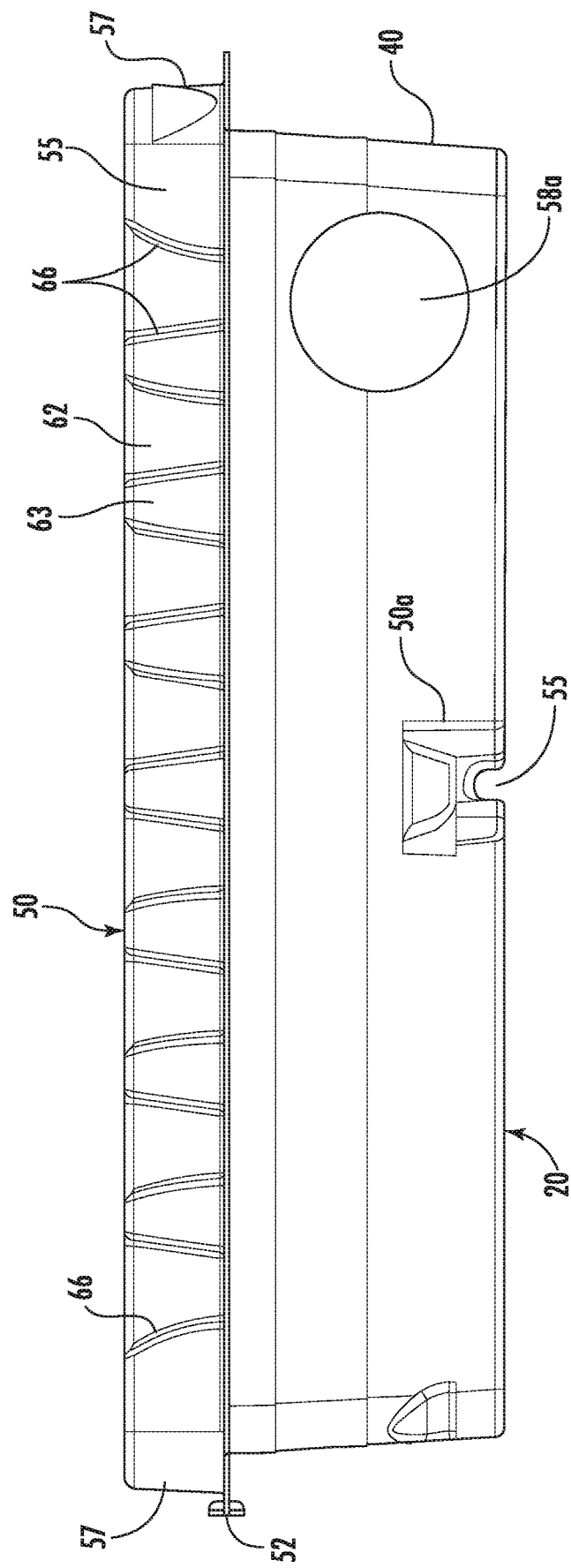

METHOD OF PRODUCING A PACKAGING CONTAINER WITH A CLOSURE AND RELEASE MECHANISM AND RETENTION ELEMENTS

TECHNICAL FIELD

The present disclosure relates to a method of manufacturing a packaging container having a secure closure and retention elements for retaining an object within the container.

SUMMARY

The disclosure relates to a process for manufacturing a container with a closure-release mechanism. The process in particular relates to thermoforming a container having a base section and a cover section connected by a hinged portion, with the base section having an outer wall segment at least partially surrounding a perimeter of the base section and the cover section having an inner wall segment at least partially surrounding a perimeter of the cover section, a plurality of protrusions formed in the outer wall segment of the base section and a plurality of indentations formed in the inner wall segment of the cover section, the plurality of protrusions of the base section engaging the plurality of indentations of the cover section. The method includes heating a sheet of thermoplastic material to form a heated flexible sheet, transferring the heated flexible sheet to a mold, the mold having a width, a height, an interior volume, one or more walls, end walls, a floor and a top, a pre-formed shape of a base section comprising a bottom surface and spaced apart inner and outer wall segments, a pre-formed shape of a cover section comprising a top surface and spaced apart inner and outer wall segments, and a channel positioned between the base section and the cover section of the packaging container. The method further includes securing a module having a moving part with a working face to the mold, actuating the moving part such that the working face thereof extends into the heated flexible sheet and the interior volume of the mold to form a projection in the heated flexible sheet, cooling the heated flexible sheet to form a cooled shaped sheet that is rigid enough to be removed from the mold without losing the shape of the mold, actuating the moving part in order to retract the working face from the interior volume of the mold, and extracting the cooled shaped sheet from the mold.

BRIEF DESCRIPTION OF THE DRAWINGS

FIG. 1 shows a side view of one embodiment of a packaging container formed with the present method.

FIG. 2 is a top view of the packaging container of FIG. 1.

FIG. 3 shows a side view of the base of the packaging container of FIG. 1.

DETAILED DESCRIPTION

Figure 4:
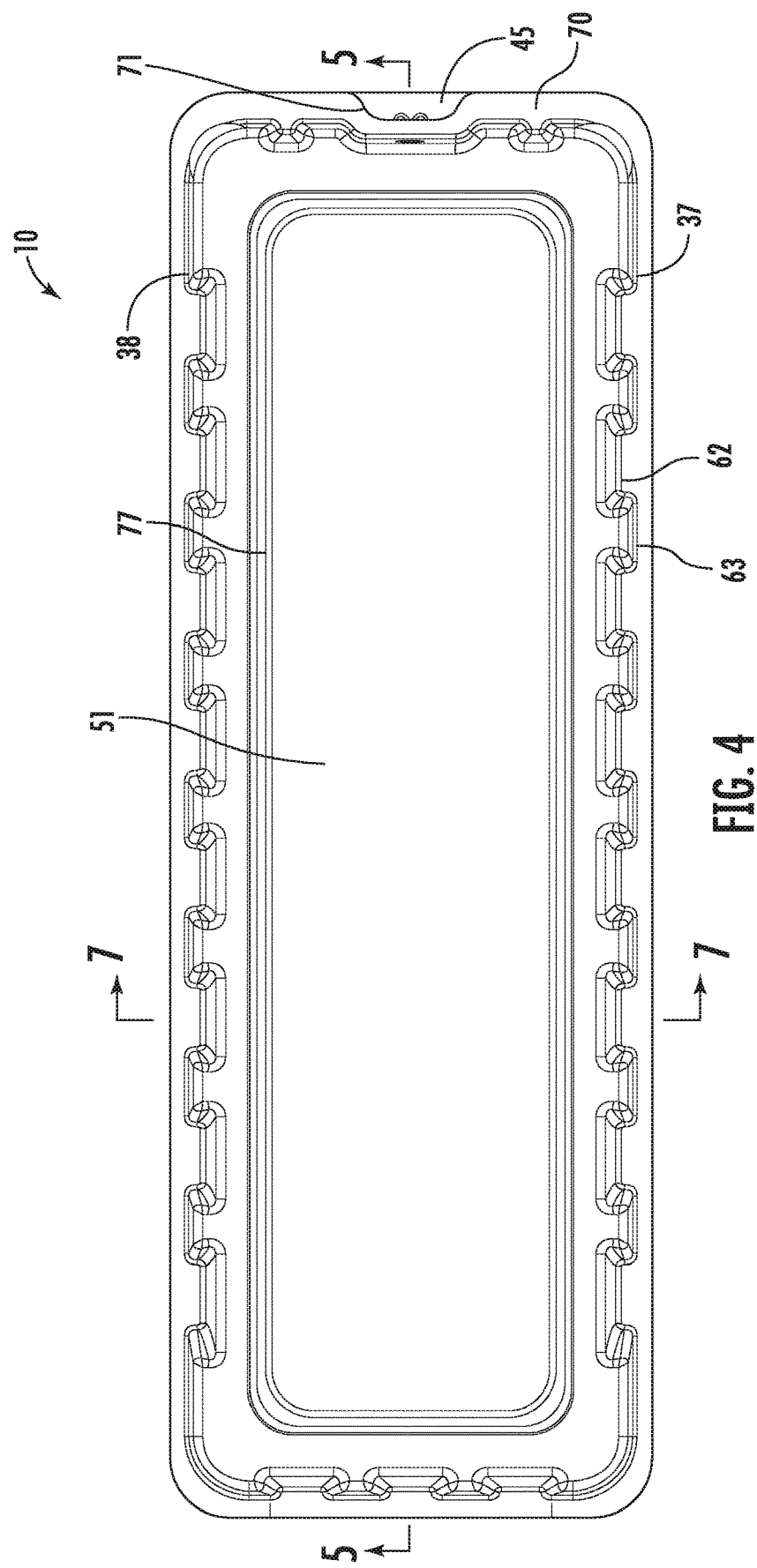
FIG. 4 illustrates a top view of a cover section of the packaging container of FIG. 1.

From the following detailed description of certain embodiments and examples, it will be apparent that various modifications, additions and other alternative embodiments and examples are possible without departing from the true scope and spirit of the disclosure. Also, it is to be understood that the phraseology and terminology used herein is for the purpose of description and should not be regarded as limiting.

With reference to FIGs. 1 and 2, a packaging container 10 includes a base section 20 having a bottom surface 31, first and second inner and outer base side walls, 28 and 29, and first and second inner and outer base end walls, 35 and 36, forming a chamber 25. Outer base side walls 29 and outer base end walls 36 are spaced apart from inner base side walls 28 and inner base end walls 35 and extend only a portion of the height of inner base side walls 28 and inner base end walls 35. Outer base side walls 29 and outer base end walls 36 may include a plurality of indentations 32 and protrusions 33.

Packaging container 10 also includes a cover section 50 pivotally coupled to base section 20. Cover section 50 is configured to pivot about hinge 52 between an open state and a closed state. In particular, cover section 50 includes a top surface 51 having a recessed channel 77, first and second side walls 55, and first and second end walls 57. Cover compartment 50 fits over base section 20. Cover section 50 also includes a plurality of indentions 62 and protrusions 63 formed therein for engaging with indentions and protrusions 32 and 33 of base section 20.

When a hinge 52 is activated in order to close lid 50 onto base section 20, indentations and protrusions 62, 63 of cover section 50 meet with indentations and protrusions 32, 33 of base section 20. Each indentation 62 of cover 50 fits into a corresponding protrusion 33 on base section 50 and each protrusion 63 of cover 50 fits into a corresponding indentation 22 of base section 20. Thus, when cover 50 is closed onto base section 20, protrusions 32 and 62 and indentations 33 and 63 form a zippered relationship between base section 20 and cover 50. As shown in FIG. 2, cover indentations and protrusions 62, 63 and base indentations and protrusions 32, 33 have arcuate, or curved, side walls, as indicated at 66, when positioned closer to ends 36 (36 is not shown in FIGS. 3) and 57 to allow for a smooth closure of container 10. The degree of curvature is greater closer to outer base end walls 36 (not shown in FIG. 3) and cover end walls 57, as can be seen in at least FIGS. 1 and 3.

The zippered relationship of indentations and protrusions 32, 33 and 62, 63 not only aids in maintaining cover 50 securely fastened onto base section 20, it contributes to the overall strength of container 10. That is, upon applying lateral pressure to one or more of outer base side walls 29, lid 50 is not released and container 10 is not easily opened due to the function of the zipper. Thus, the zippered relationship between base section 20 and cover 50 contributes to the overall tamper-proof qualities of container 10.

A closure and release mechanism is also included in packaging container 10. As shown in FIG. 5, a post 67 projects inwardly from cover end wall 57. In one embodiment, post 67 includes an angled edge and a top edge. Post 67 is adapted to engage corresponding inner and outer apertures 68 and 69 of base section 20. A peripheral flange 70 extends horizontally from a perimeter of cover section 50 such that, when packaging container 10 is in a closed position, peripheral flange 70 abuts a flange 45 of base section 20. Peripheral flange 70 includes a cut out area 71, as shown in FIG. 4, to allow access for opening container 10.

Laterally extending flange 45 is deformable such that when flange 45 is depressed adjacent to cut out area 71, outer base end wall 36 and inner base end wall 35 move inwardly away from cover end wall 57, thereby releasing post 67 from apertures 68 and 69 and opening packaging container 10. Cut out area 71 provides unobstructed access for depressing deformable flange 45 for opening packaging container 10.

Figure 5:
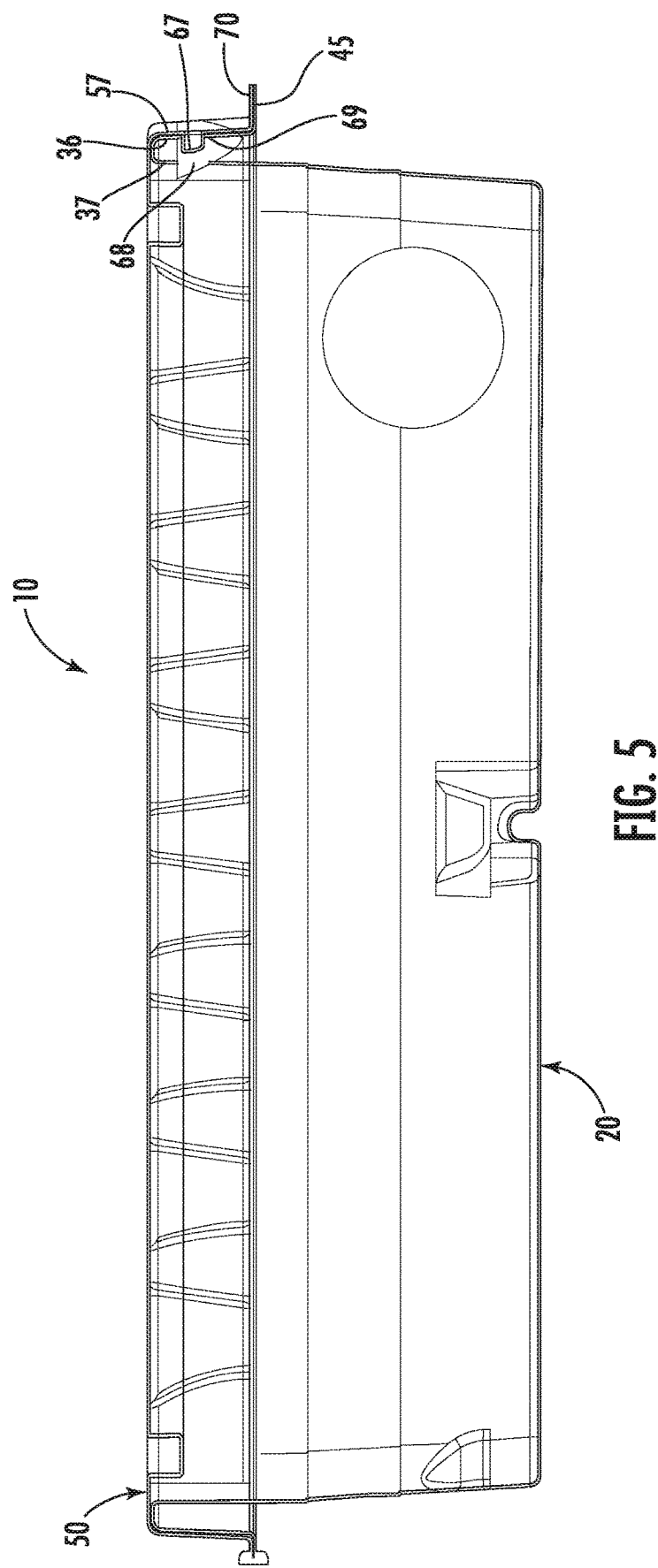
FIG. 5 provides a side view of the packaging container with a closure and release mechanism.
Figure 6:
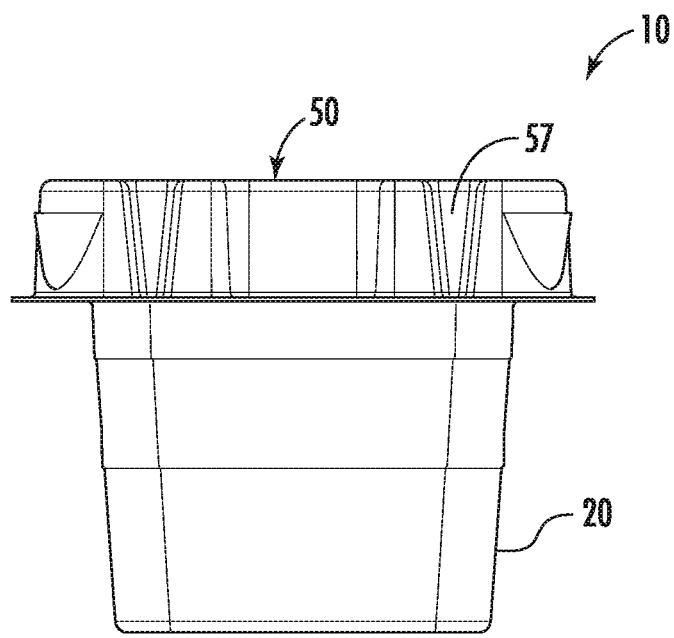
FIG. 6 illustrates a back view of the container shown in FIG. 1 in a closed state.
Figure 7:
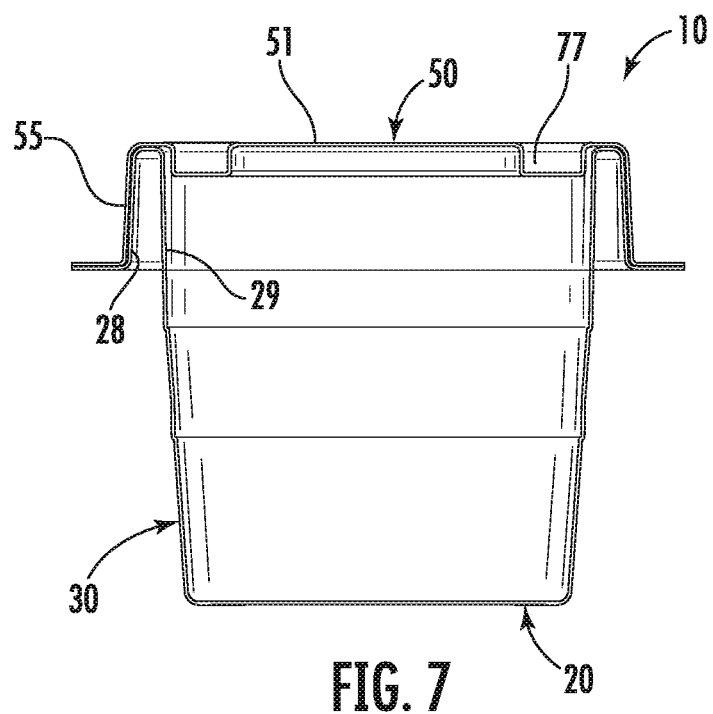
FIG. 7 shows a cut-away view of the packaging container of FIG. 6 illustrating a channel in the cover section thereof.

As shown in FIGS. 4, 5 and 7, container 10 includes a recessed channel 77 formed in cover 50 for providing structural support to container 10. Alternatively, top surface 51 of cover 50 may be recessed to provide structural support. Features such as lettering and/or symbols or graphics (not shown) on top surface 51 may also provide additional structural support. Recessed channel 77 functions to resist inner base side walls 28 and outer base side walls 29 from being pushed inward away from cover side wall 55, thereby preventing a deflection of the side walls and release of the zipper. Further, in some embodiments, recessed channel 77 may extend to a depth that further resists deflection of outer base end wall 36 and inner base end wall 35. The recessed channel 77 would function as an obstructive: member that would prevent the container from opening via depression of flange 45 and deflection of walls 36 and 35. This would essentially result in a container that cannot be opened without severe deformation of or significant damage/alteration to the container, such as tearing or cutting. That is, if recessed channel 77 extends adjacent to aperture 69 of inner base end wall 35, movement of inner base end wall 35 is resisted by recessed channel 77. Therefore, post 67 is not released from apertures 68 and 69 and cover section 50 remains secured in a closed position over base section 20.

Figure 8:
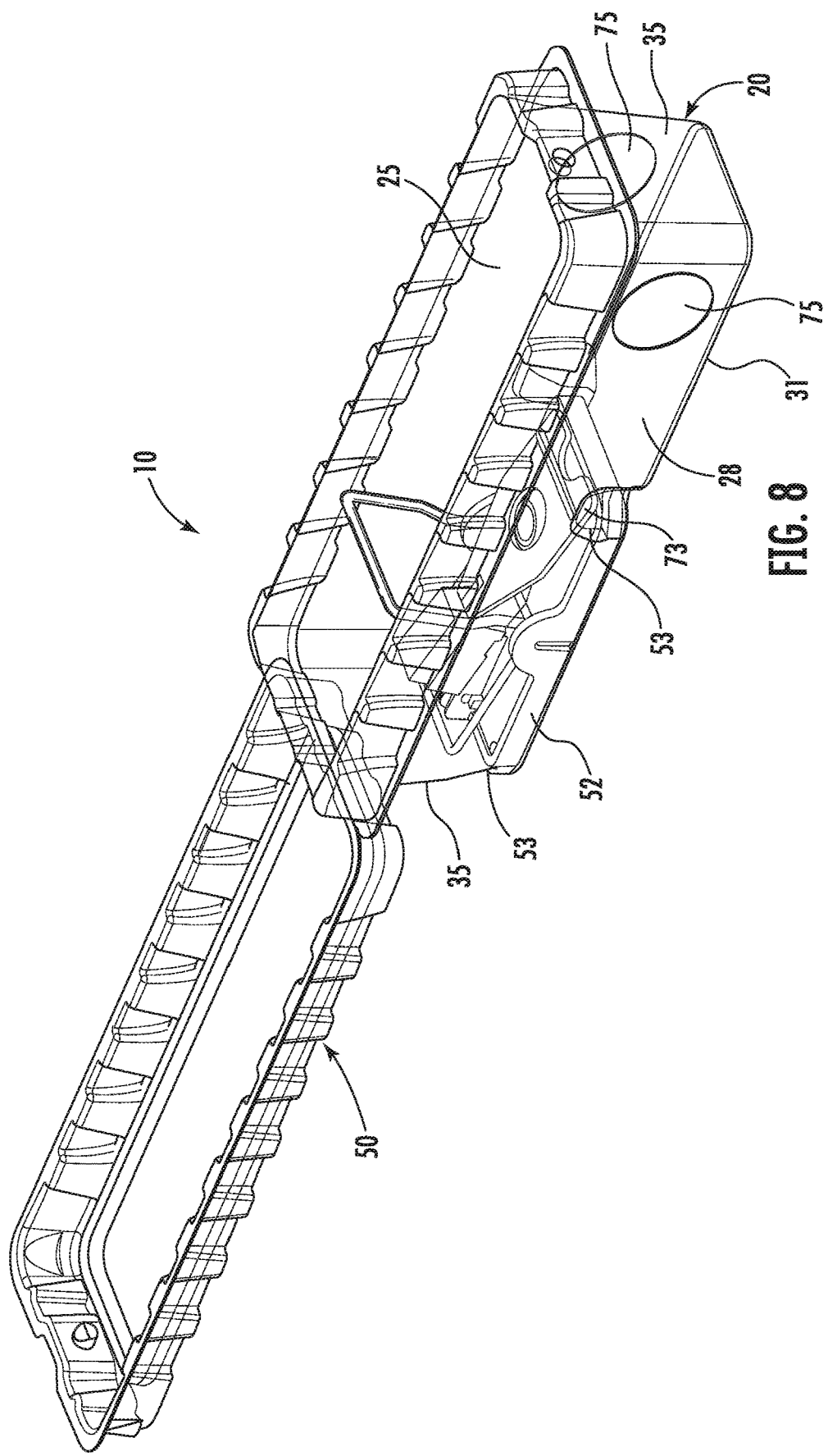
FIG. 8 provides a perspective view of the packaging container shown in FIG. 1.
Figure 9:
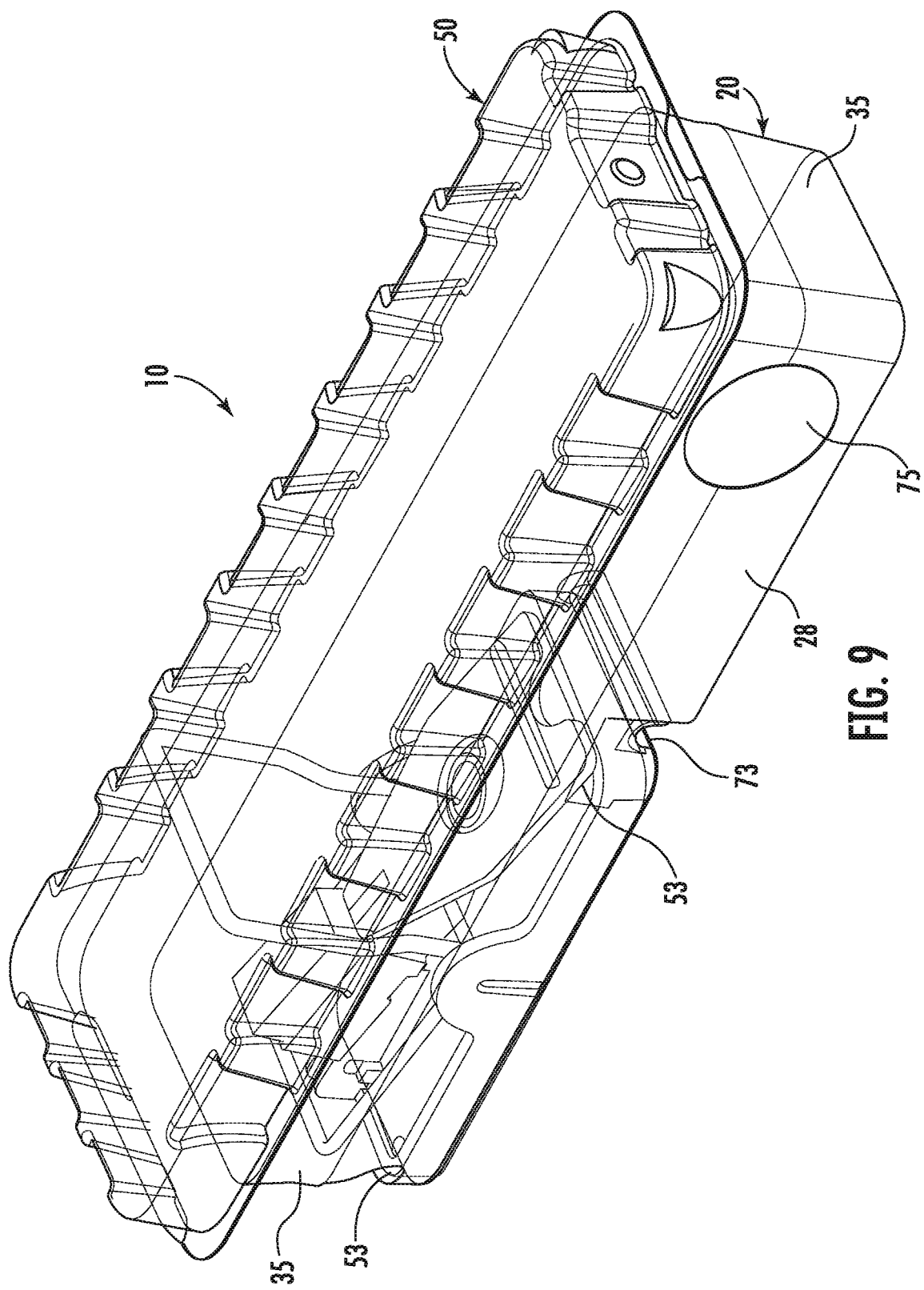
FIG. 9 shows the packaging container of FIG. 8 in a closed state.

As illustrated in FIGS. 8 and 9, base section 20 is adapted to retain an object 52 such as a trapping mechanism for the trapping of rodents or other pests. Object 52 is retained against bottom surface 31 of base section 20 via a snap-in retention mechanism including a plurality of detents, each of which is indicated at 53, and formed within the chamber 25 of base section 20. Detents 53 are formed along inner base side walls 28 and inner base end walls 35. The snap-in mechanism of base section 20 also includes a retaining rib 73 formed in bottom wall 31 of base section 20. The snap-in mechanism including retaining detents 53 and retaining rib 73 is configured to inhibit movement of object 52 within base section 20.

Container 10 may also comprise one or more cut-out portions 75 formed on one or more of inner base side walls 28, which may provide an entrance point for pests such as rodents. Cut-out portions 75 may be of any known shape including circular, rectangular, square, or the like. Base section 20 may also contain bait to lure rodents or other pests into container 10 by way of cut-out portions 75.

Packaging container 10 is formed from a sheet of thermoplastic material, such as polyvinyl chloride (PVC), Polyethylene, Impact Modified Polystyrene, Acrylic, Acrylonitrile Butadiene Styrene (ABS), Polycarbonate or any plastic otherwise suitable for thermoforming. Any desired thickness of plastic that is compatible with the plastic and the thermoforming process/machine being employed may be used. Without limiting the foregoing statement, generally the plastic may have a thickness of between about 0.010 inches and about 0.125 inches, or of from about 0.015 inches to about 0.090 inches, or of from about 0.15 inches to about 0.60 inches.

Typically, in a molding process, a preheated sheet of thermoplastic material is drawn into, or over, a mold to create the desired shape of the final product. After the material has reached a stable set point, such that it is rigid enough to be removed from the mold without losing the molded shape, the sheet is withdrawn in the opposite direction from which it entered the mold. Typically, the sheet enters the mold and is removed from the mold in a vertical fashion.

Methods of molding wherein an article with planar surfaces, such as a container having rectilinear sides is formed, may require that variations in the planar geometry thereof be introduced via a corresponding mold. Such a mold interior surface includes portions that project inwardly from the planar surface in order to create an indent in the container, which may be referred to as an undercut. The method of molding as disclosed herein provides a means of forming features in an article, including undercuts, which may be linear, angular, arcuate, and/or circular features. The disclosed method thus provides a means of imparting features to an article without the requirement of creating a new mold when variations in the shape, size, quantity, or position of those features change.

Retractable features within the mold, such as a round post or pin, may be formed within the mold. When the heated plastic sheet is drawn into the mold, the post or pin is in an extended position. The plastic forms around the post or pin, adopting its shape. The post or pin is then retracted until the face of the post is at least substantially flush with the sidewall of the mold. Thus, retraction of the post or pin facilitates removal of the plastic product from the mold. Mechanical linkages and other drive mechanisms may be used. Alternately, magnetics, pneumatic cylinders or the like may be employed. The timing of the projection of the feature outbound from the sidewall of the mold may be fine-tuned by being in the fully retracted position prior to the heated material entering the mold and being activated (i.e. extended) just after the material has entered the mold, but prior to the material cooling beyond the point where it will be able to deform around the feature.

The current method of molding involves use of a module with a movable part having a working face. The module may be secured to the mold so that the working face effectively forms part of the interior surface of the mold. The working face of the movable part may, through actuation of the movable part, be extended into, and retracted from, the interior volume of the mold. The movable part is extended into the interior volume of the mold in order to impart the desired feature to the article being formed, and then retracted to enable extraction of the formed article, by stripper plate or otherwise, without requiring excessive force or causing damage to the formed article.

Figure 10:
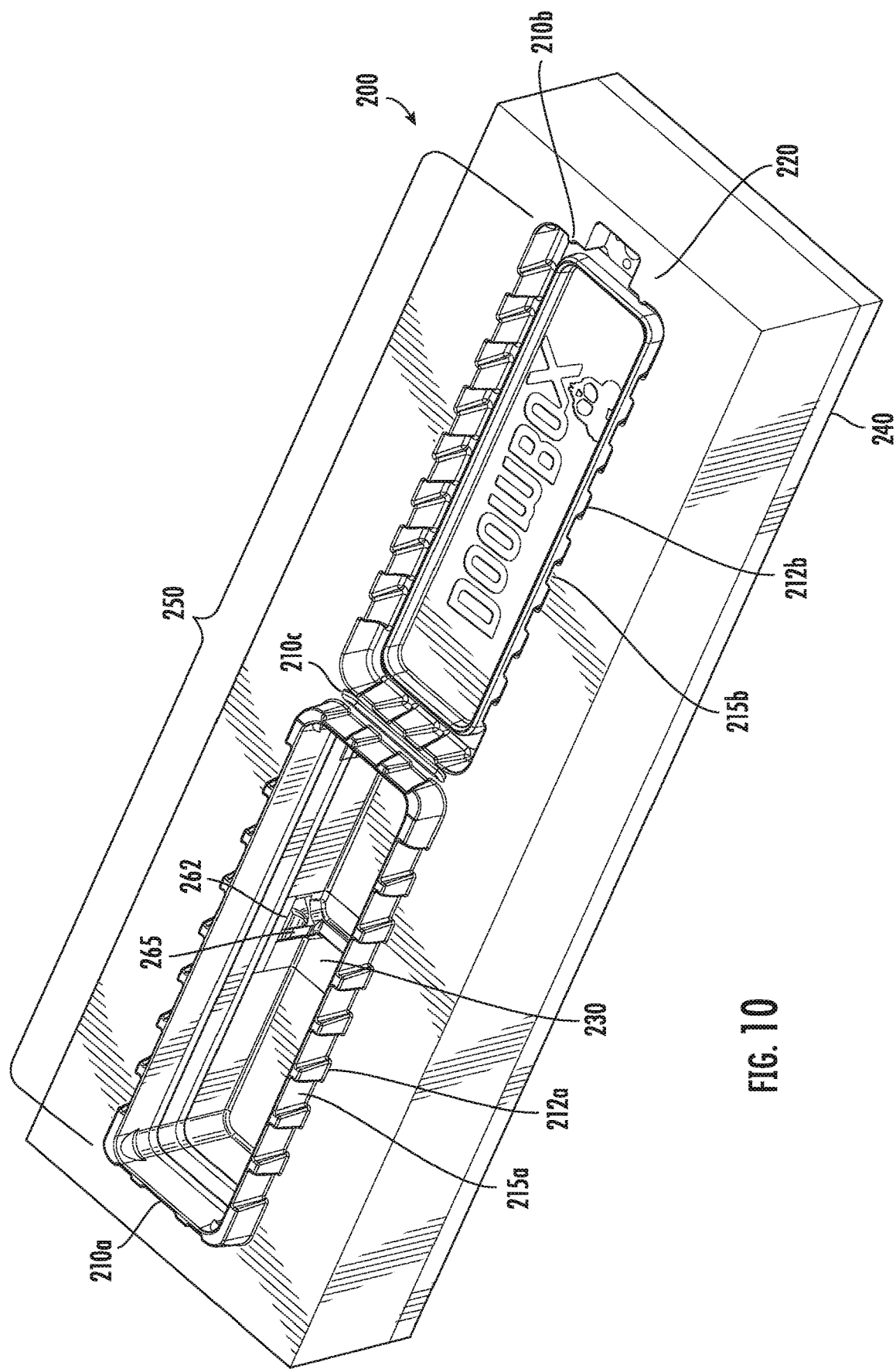
FIG. 10 illustrates a perspective view of a molding tool having a moveable part and working face

Referring to FIG. 10, a first embodiment of a molding apparatus 200, is shown. Molding apparatus 200 comprises a molding tool 220 and a back plate 240. Molding tool 220 comprises mold interior volume 250 into which an article to be formed may be positioned. The article may comprise packaging container 10, as previously described or any number of different products being formed such as containers or other items, which may vary in shape or size, and which may be open on one end, or comprise a cover or lid. The article may thus comprise a single part or multiple parts. FIG. 10 exemplifies one embodiment of forming an article using the current method, wherein an article comprises a bottom section 210a and a cover section 210b. Bottom section 210a and cover section 210b may also be connected by a hinge 210c as shown in FIG. 10.

Figure 11:
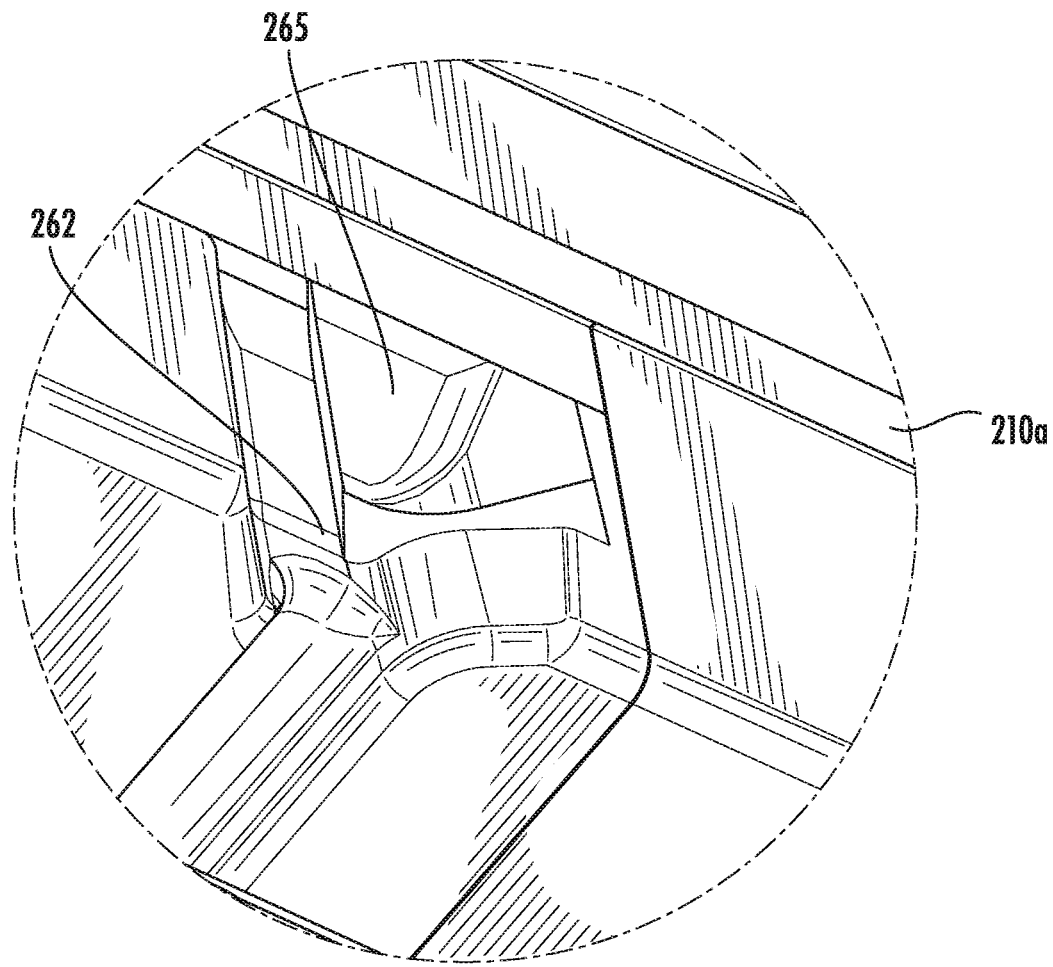
FIG. 11 shows a magnified view of a moveable part with a working face in an extended position.

With respect to FIG. 10, molding apparatus 200 comprising molding tool 220 is shown comprising mold interior volume 250 into which article to be formed 210 may be positioned. Article 210 comprises bottom section 210a, lid 210b, as well as hinge 210c therebetween. Also shown, is the moving part 265 with working face 262 in a retracted position. FIG. 11, provides an enlarged view of working face 262 in an extended position as working face 262 extends into an interior volume 250 of mold 220 via moving part 265.

The extension and retraction of moving part 265 and working face 262 relative to the thermoplastic sheet (not shown) imparts a desired feature to article 210 including undercuts, which may comprise protrusions 212a, indentations 215a, or other features formed on bottom section 210a of article 210. The disclosed method also enables the formation of features on cover section 210b including undercuts, which may comprise protrusions 212b and indentations 215b or other features as shown in the figures.

In use, molding tool 220 has a module 230 with movable part 265 and working face 262. Moveable part 265 and working face 262 may be used to form features in article 210 by providing a sheet of thermoformable plastic (not shown), which may be brought into contact with mold interior surface 250 by one or more of air pressure, vacuum, plug assist, or any other suitable method. Mold interior 250 may also include several fixed features, 215a, 215b and 212a, 212b, to impart indentations and protrusions within container 10, as discussed previously. Additional features may be formed by movable part 265 with working face 262 by actuating movable part 265 to first extend working face 262 into the mold interior volume 250. The extension of working face 262 into the interior volume 250 deforms the thermoformable plastic adjacent to working face 262 to conform to the shape of working face 262. The movable part 265 with working face 262 is then actuated to retract, such that working face 262 is at least substantially flush with mold interior surface 250. Subsequently, formed article 210 is then extracted from molding tool 220.

It should be noted that working face 262 may not be planar and so may not be capable of being truly flush with a planar wall or floor of the mold. Therefore, as used herein with regard to the working face, "flush" or "substantially flush" mean that the working face is in a position such that any projection of any portion of the working face past the surrounding planar surface of the mold and into the interior volume of the mold will not cause significant resistance to extraction of the formed article from the mold, or cause damage to the formed article during such extraction.

Figure 12:
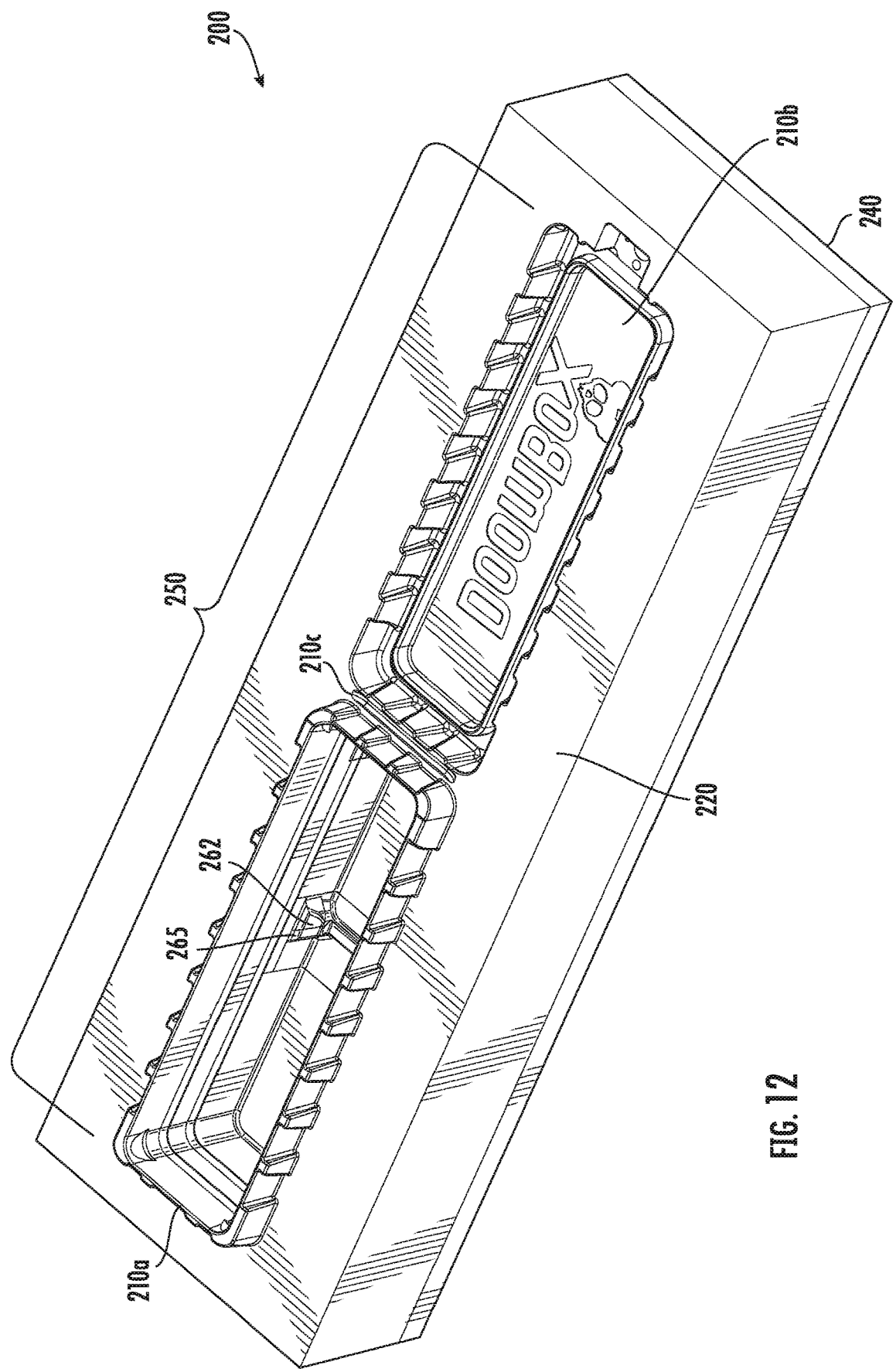
FIG. 12 provides a perspective view of a molding tool having a moveable part and working face.

Module 230 comprising a moveable part 265 having a working face 262 may be utilized to form features such as undercuts in either one or both of bottom section 210a and cover section 210b of article 210. As shown in FIG. 12, and enlarged in FIG. 13, working face 262 is in an extended position, wherein working face 262 contacts mold interior surface 250.

Figure 13:
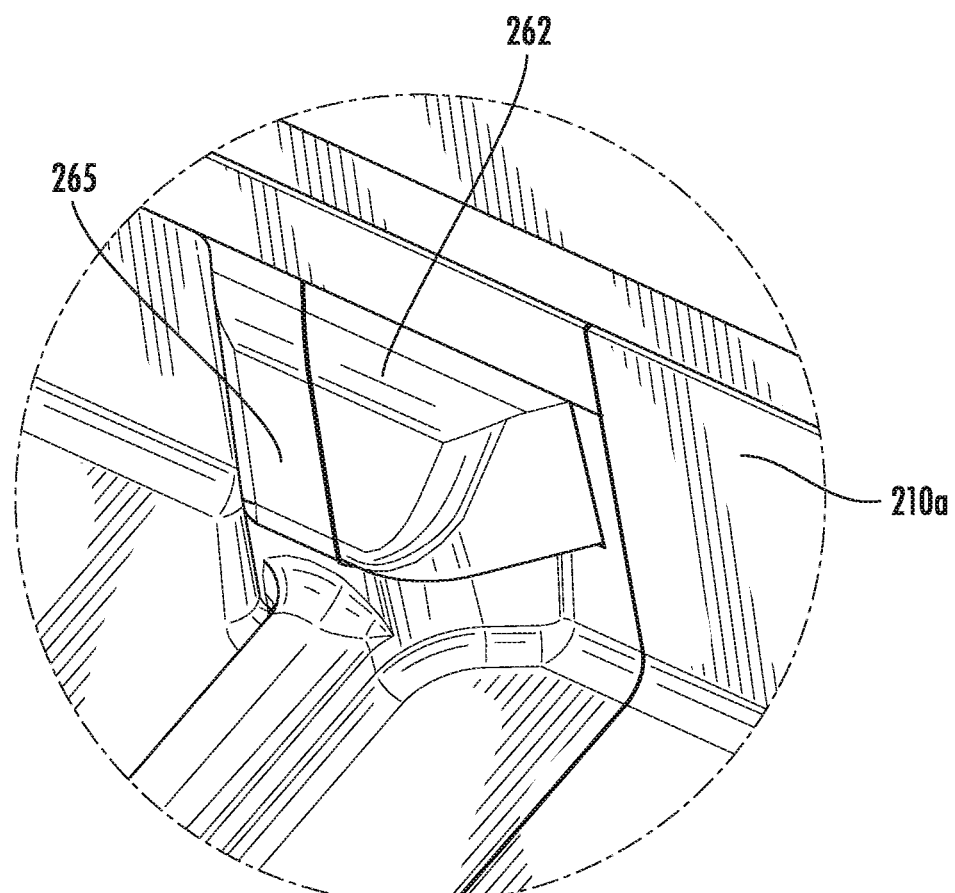
FIG. 13 shows a magnified view of a moveable part shown in FIG. 12 wherein the working face is retracted.

In FIGS. 10 and 11, working face 262 is actuated in order to retract working face 262 from the interior volume of the mold 250. FIG. 13, provides an enlarged view of working face 262 in the retracted position as working face 262 retracts from mold interior volume 250 subsequent to forming features in bottom section 210a of the article.

Figure 14:
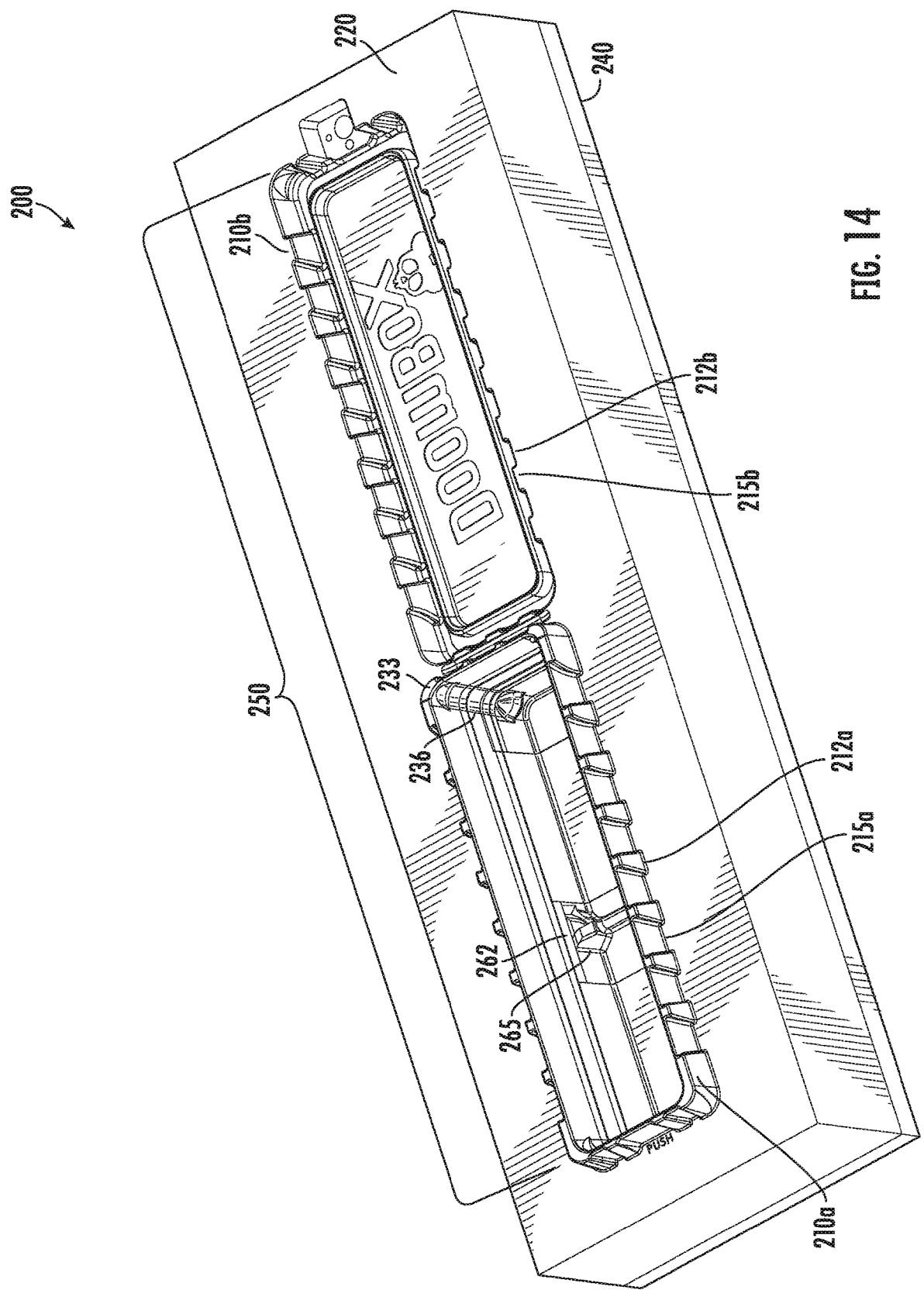
FIG. 14 shows a second embodiment of a molding tool comprising two moveable parts each with a working face.

FIG. 14 illustrates a second embodiment of a molding method wherein first moving part 265 with first working face 262 are utilized in conjunction with a second moving part 236 with a second working face 233. As before, molding apparatus 200 comprises molding tool 220 and back plate 240. Molding tool 220 comprises mold interior volume 250 into which article 210 to be formed may be positioned. Article 210 may comprise a single part or multiple parts, exemplified here by bottom section 210a and cover section 210b as shown in FIG. 14. Bottom section 210a and cover section 210b may also be connected by hinge 210c. Here, second moving part 236 with working face 233 is shown in an extended position.

Figure 15:
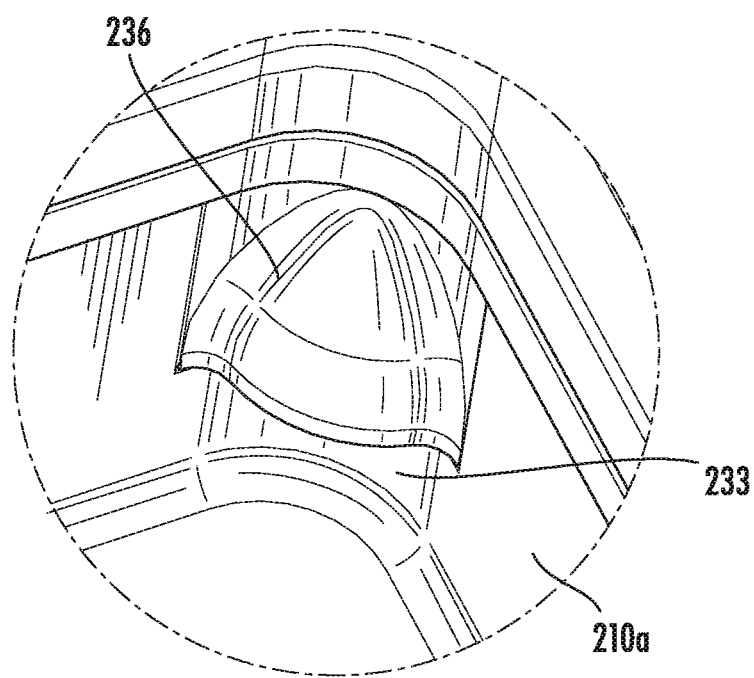
FIG. 15 shows a magnified view of a second moveable part shown in FIG. 14 wherein the working face thereof is in an extended position.

The movable parts 265/236 with working faces 262/233 may have any of a wide range of shapes including linear, angular, arcuate, etc. as well as a variety of sizes. Thus, while moving part 265/236 may be used to create an arcuate undercut, moving part 265/236 may also create a linear undercut, like a shelf, as well as other shapes, including complex shapes that may combine two or more different geometries, characterized by both linear and curved areas. In addition, module 230 may be positioned at any location of the interior volume of mold 250, including the floor, side walls, and top portions thereof. Molding apparatus 200 may also utilize different types of modules 230, which may comprise multiple movable parts, each with a working face, and/or molding apparatus 200 may utilize more than one module 230. FIG. 15, provides an enlarged view of second moving part 236 showing second working face 233 in an extended position.

Figure 16:
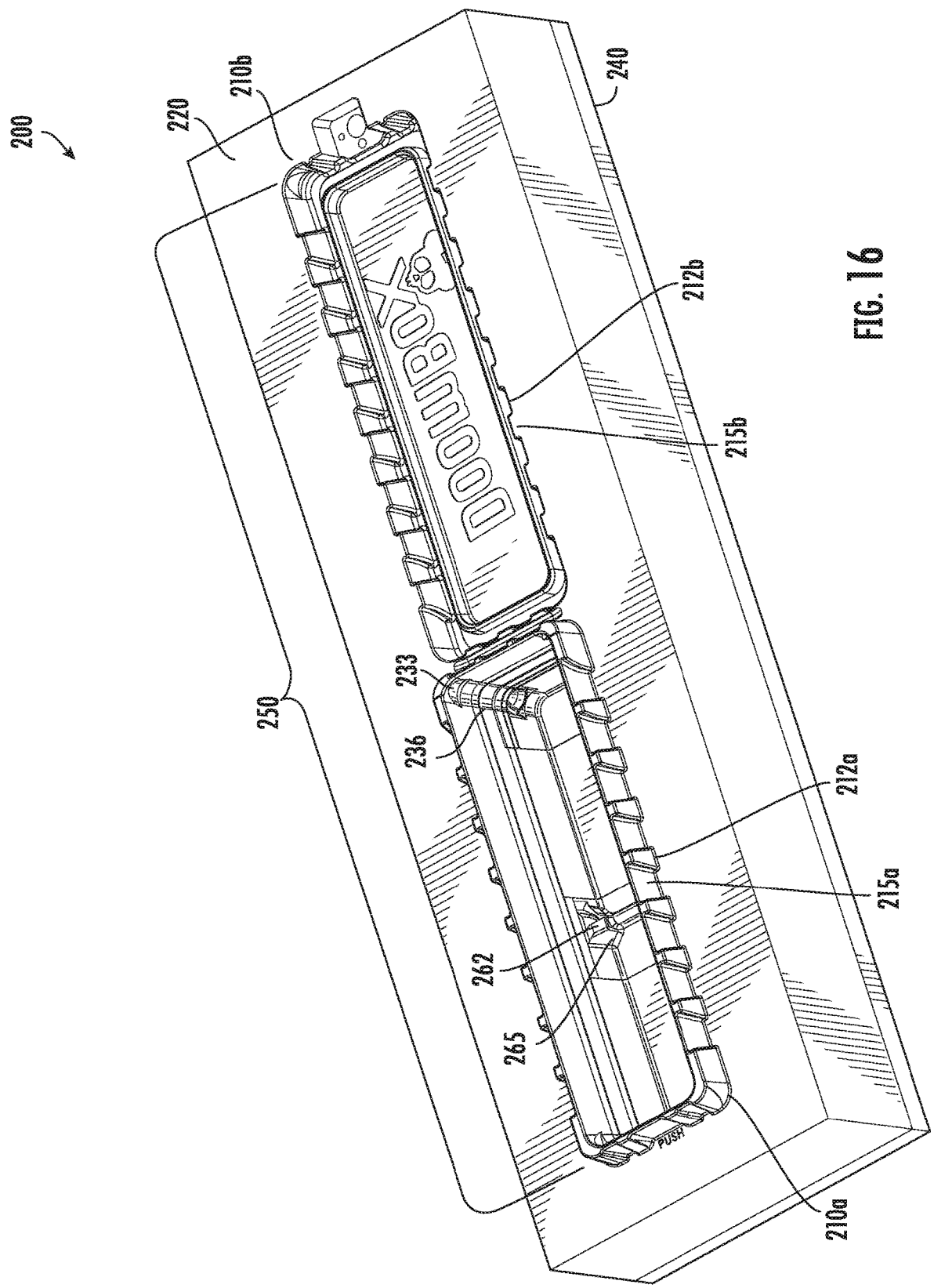
FIG. 16 shows the second embodiment of a molding tool wherein the moveable part and its working face are in a retracted position.
Figure 17:
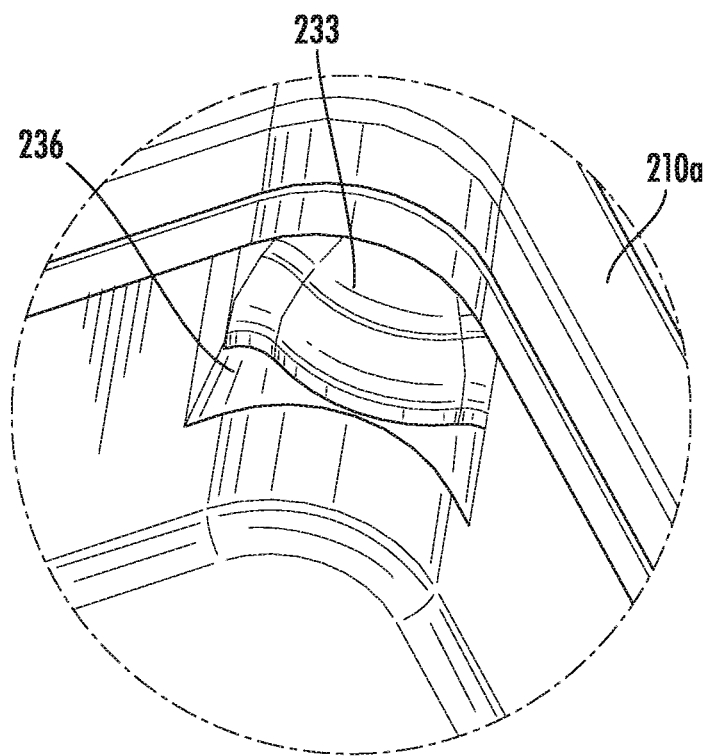
FIG. 17 provides a magnified view of the second moveable part shown in FIG. 16 with its working face in a retracted position.

With respect to FIG. 16, molding apparatus 200 comprising molding tool 220 and back plate 240 is shown. Molding tool 220 comprises mold interior volume 250 into which article to be formed 210 may be positioned. Article 210 comprises bottom section 210a, cover section 210b, as well as hinge 210c. Also shown in FIG. 17, is second moving part 236 actuated such that second working face 233 is in a retracted position.

The extension and retraction of moving parts 265 and 236, as well as working faces 262 and 233 relative to the thermoplastic sheet (not shown), imparts desired features to article 210 being formed, including undercuts, which may comprise protrusions 212a or indentations 215a formed on bottom section 210a of article 210. The disclosed method also enables the formation of features on cover section 210b of article 210 including undercuts, which may comprise protrusions 212b and indentations 215b as well as other features as shown in the drawings.

In particular, the present method involves providing, in connection with a thermoforming mold 220, a moving part 265 that can be projected into, and retracted from, the interior volume of the mold. In this context, the interior volume of the mold 250 is generally considered to consist of the interior volume or inner surface of the mold 250 with the moving part 265 in place and in a retracted position with respect to the interior volume 250 of the mold. The interior volume of the mold 250 may also be generally considered to be that part of the inner surface of the mold that is in contact, or near contact, with the heated sheet of thermoforming plastic after the sheet has been fully brought into the interior volume 250 of the mold through use of one or more of plug assists, vacuum draw, air pressure, and/or other known methods.

Figure 18:
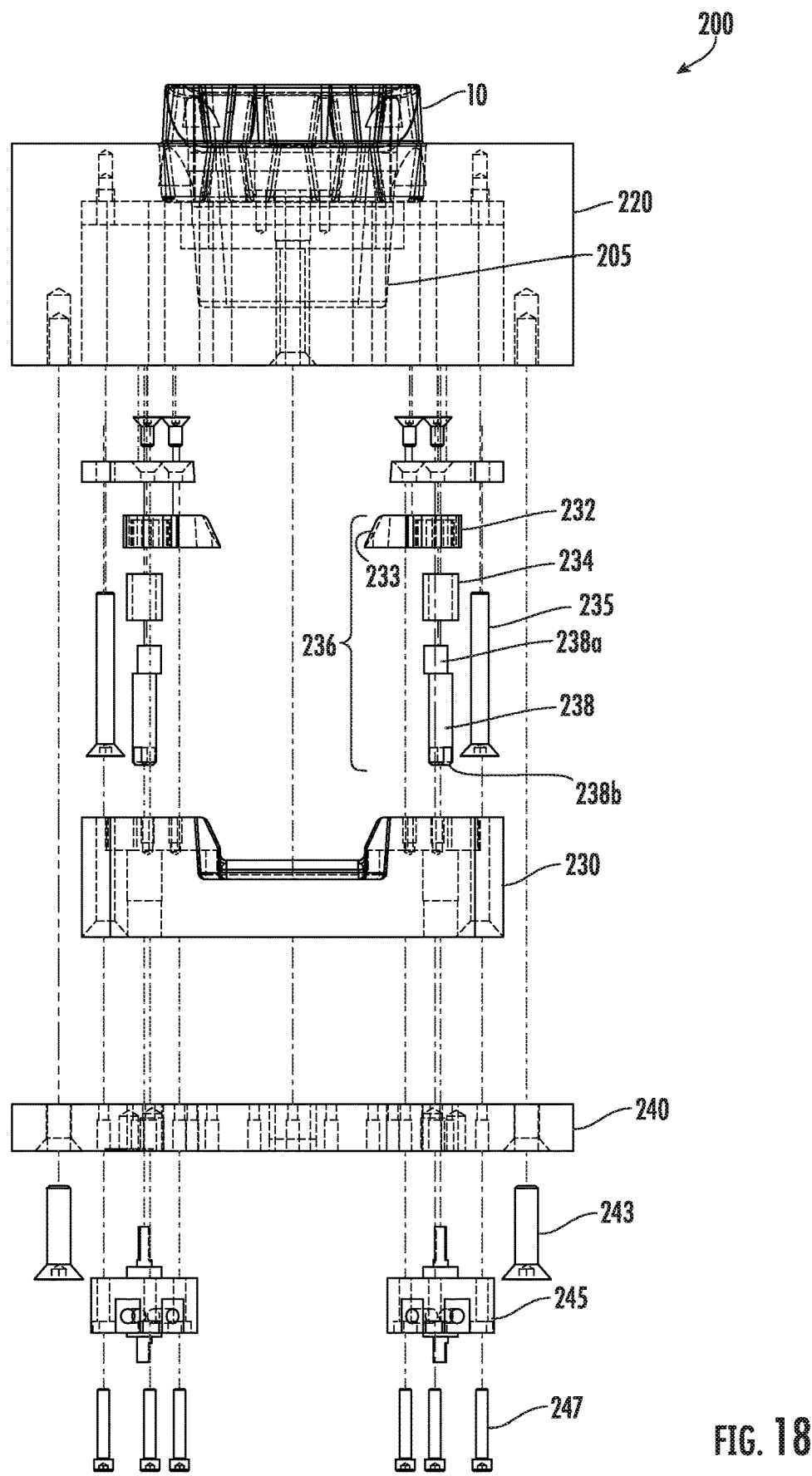
FIG. 18 provides an exploded side view of one embodiment of a molding apparatus disclosed herein.
Figure 19:
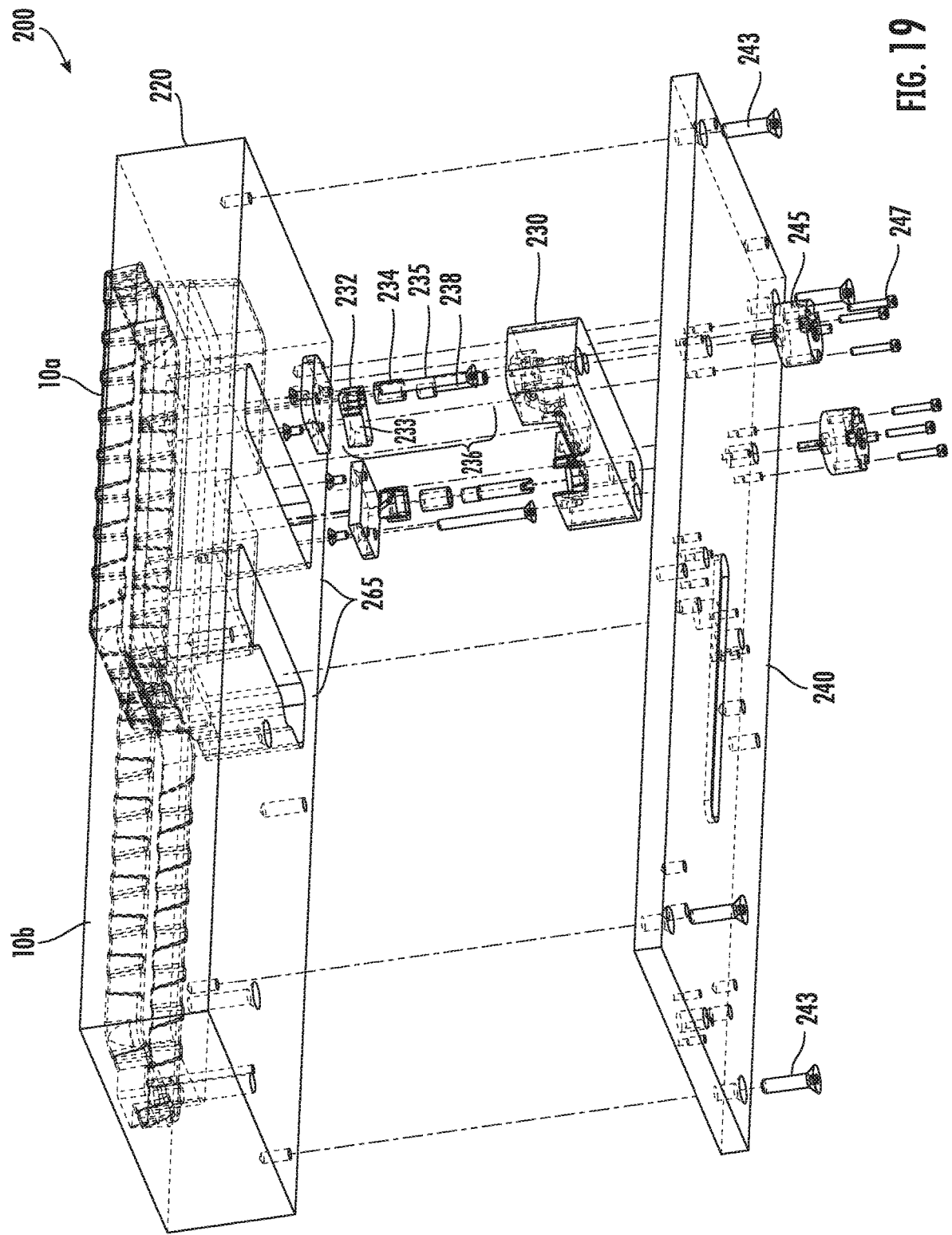
FIG. 19 provides an exploded side view of another embodiment of a molding apparatus disclosed herein.

FIGS. 18 and 19 are end and side exploded views of the molding apparatus 200. As illustrated in FIG. 18, apparatus 200 includes a mold 220 with an insert 205 formed therein, as well as an article or container 10 being formed. A module 230 is included for forming various features in article 10 including arcuate, square, and triangular features as well as combinations thereof. Module 230 may be made of aluminium or other similar light-weight material and may include one or more moveable parts 236 each having one or more working heads/faces 233, as well as one or more bushings 234 into which one or more cam shafts 238, having first and second ends, 238a and 238b, are held. A plurality of fasteners 235 securely fasten module 230 into molding tool 220 such that module 230 fits within insert 205. A back plate 240 is positioned over molding tool 220 in order to cover molding tool 220 and ensure that all components housed within molding tool 220, including article 10 being formed and module 230, are securely fastened within molding tool 220. This may be accomplished by fastening back plate 240 onto molding tool 220 via fasteners 243 positioned at each corner of back plate 240, as well as one or more brackets 245 held in place by one or more fasteners 247.

FIG. 19 provides a perspective view of molding apparatus 200 with an alternate or additional module 260. As shown in FIG. 19, article 10 being formed is positioned within molding tool 220 and may comprise a bottom section 10a and a cover section 10b. Module 260 may be secured to molding tool 220 such that working face 262 forms part of the interior surface of molding tool 220. Working face 262, positioned on movable part 265, may comprise bushings 234 and cam shafts 268, which may, through actuation of movable part 265, be extended into, and retracted from, the interior volume of molding tool 220. The movable part is thus extended into the interior volume of molding tool 220 in order to impart a desired feature to article 10 being formed, and then retracted to enable extraction of the formed article 10, by stripper plate or otherwise, without requiring excessive force or causing damage to the formed article.

In general, the packaging container 10 is manufactured using a thermoforming process including heating, forming, punching, and trimming stages. The process according to the present disclosure thus begins with the heating stage. This stage generally entails the thermoplastic sheet initially being conveyed to a heating station, also called a heating tunnel, wherein at least one heating plate is installed to raise the temperature of the plastic sheet entering the heating station. The heating plate may include a plurality of heating elements disposed throughout the heating plate to maintain the heating plate at a relatively constant temperature throughout. The heating process makes it possible to take advantage of the thermoplastic behaviour of the material. That is, the thermoplastic sheet initially may be rigid or otherwise unfavourable to stretching or molding but can be softened by heating and thereby molded to form a container of a desired shape, size, and dimension in an easy, rapid, and precise manner. The plastic sheet is heated to the temperature such that it can be molded to any desired shape. In general, the heated processing temperature may vary depending on the particular material to be molded, such as from about 200 degrees F. to about 1,200 degrees F., or from between 300 degrees F. to about 800 degrees F. For example, polyvinyl chloride (PVC) typically exhibits a forming temp of about 350 degrees F., but also has a range of workable temperatures. Other materials, such as polyethylene terephthalate (PET), have a similar forming temperature of about 350 degrees F.

After the heating process, the sheet then moves to a forming stage, wherein molding tool/machine 220 is utilized. Molding tool 220 can be created or selected to provide any shape, size, feature, and other characteristics of the desired container. The mold may be contained in a molding station or area that is separate from the heating station, but also may be incorporated into an integral piece of equipment. However, one skilled in the art would understand that variations in the configuration of the heating and molding stations may exist without deviating from the scope of this disclosure. The mold comprises a pre-formed shape and, may comprise a pre-formed shape of a bottom section and a cover section as well. For the pivot connection/hinge of the base section and the cover section, a depression for the hinge joint in the mold may be incorporated. The pre-heated thermoplastic sheet is conveyed/drawn into, or over, the mold to create the desired shape of the packaging container. The plastic sheet is fed into the machine from one end and moves along the machine from one direction to another in one axis.

Figure 20:
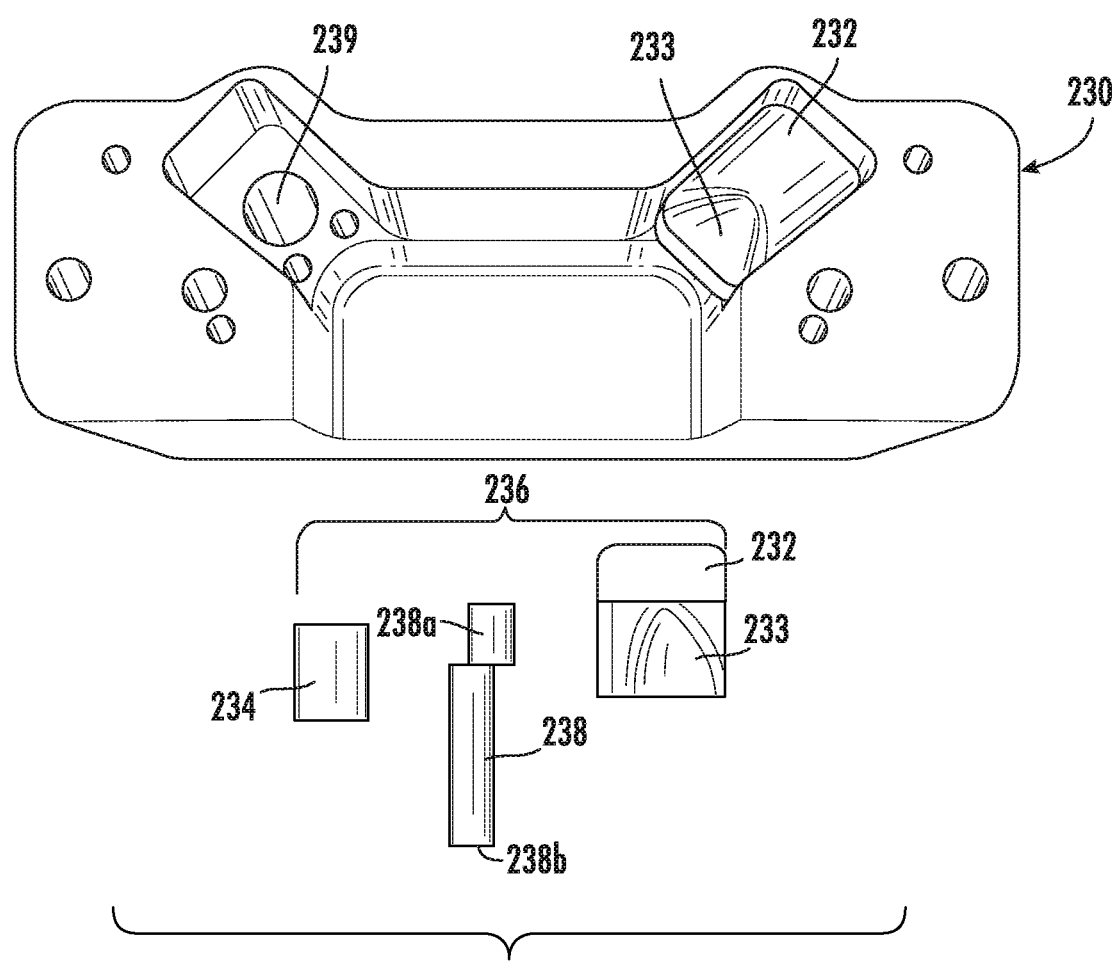
FIG. 20 illustrates a module which may be utilized with a molding apparatus.

As shown in FIG. 20, a module 230 comprising a moving part 236 typically includes a moving head 232 with a working face 233, and a driving part that can be actuated to project the moving head 232 into, and retract the moving head from, the interior volume of the mold. The driving part may be a camshaft 238 or similar element with an eccentric portion that causes moving head 232 to project or retract in response to rotation or other movement of driving part 238. The driving part 238 may have first and second ends, 238a and 238b, and the moving head 232 may have an aperture to receive a first end 238a of the driving part. The second end 238b of the driving part may be operably connected to a source of motive power used to actuate the driving part. Once a sheet of heated thermoplastic material is positioned in an interior section of the mold, moving head 232 is projected into the interior volume of the mold. Simultaneously, working face 233 of moving head 232 is put in contact or substantially in contact with the thermoplastic sheet, such that working face 233 deforms a portion of the thermoplastic sheet into a shape corresponding to the shape of the working face.

As also shown in FIG. 20, moving part 236 includes camshaft 238 and moving head 232 with working face 233. Camshaft 238 has first end 238a and second end 238b. When assembled into an aperture 239 of module 230, second end 238b of camshaft 238 is inserted into module aperture 239 through bushing 234. Moving head 232 is placed onto first end 238a of camshaft 238 so that first end 238a projects into an aperture provided in moving head 232, resulting in the assembled moving part as shown at upper right in FIG. 20. As camshaft 238 is rotated, the movement of the eccentricity of first end 238a causes moving head 232 to extend from, or retract into, the module aperture 239. In the present method, second end 238b of camshaft 238 may be connected to a pneumatic cylinder (not shown) which uses pressurized air to rotate camshaft 238. A variety of shapes, sizes, and mechanisms may be used to accomplish the functionality depicted here, namely, the projection and retraction of a working face into and away from the interior volume 250 of the mold to form undercuts or other structural features in the product being formed.

In the module shown in FIG. 20 working face 233 is approximately triangular in profile, and in use slopes inward with respect to the vertical wall of the mold. This is designed to produce an undercut (undercuts are indicated by detents 53 and retaining rib 73 as shown in FIGS. 8 & 9) in the formed container that may be used to retain a rectangular platform, such as the base of a mousetrap as shown in FIGS. 8 and 9, having substantially the same width as the interior width of the formed container adjacent the location of the undercuts. The undercut is located a distance above the floor of formed container 10 substantially equal to the thickness of the object 52 to be retained by the undercuts. As object 52 is biased against the undercuts in the direction of the floor of the container, the undercuts deform sufficiently for the platform to move past the undercuts and into a space beneath the undercuts where the container wall has not been deformed inward. This motion results in a 'snapping' action whereby upward movement of the object is then resisted by the undercuts, whose lower surfaces rest on or near the upper surface of the platform. When the opposite end of the object, such as a rectangular platform, is also constrained by elements formed by module 260 as described in FIG. 19, the result is a retention of the object that is be highly resistant to its removal.

The working face of the moving head can of course take many other shapes to produce other corresponding features on the interior wall of the formed container. By way of non-limiting example, the undercuts or other projections formed by the moving head may have various shapes, outlines, or circumferences that are generally cylindrical, oval, square, rectangular, polygonal, or arcuate, or combinations thereof and can but need not be geometrically regular.

In addition, while the current method has generally been discussed in the context of a module that may be described as a segment of the mold, numerous alternative approaches are within the present scope. For example, the module might consist of all or substantially all of a wall of the mold, or of the floor of the mold. Alternatively, the module may attach to an aperture in a wall or floor of the mold.

A given module may also contain one, two, or more moving parts, which may be symmetrically or asymmetrically positioned in the module, including at locations along any dimension—height, width, or length—of the mold. Where more than one moving part is present, the working faces may be the same, or different.

As mentioned, working face 262/233 of movable part 265/236 may possess any of a wide range of shapes and sizes, and may be positioned at any location of the interior surface of the molding tool 220, including the floor, side walls, and top. In addition, module 230 and 260 may contain more than one movable part 265/236, and molding tool 220 may be used with more than one feature module 230 and 260. Molding tool 220 is provided with voids or apertures or inserts 265 into which modules 230 and 260 may be placed, and module 230 and 260 are removably secured to molding tool 220. This enables different modules, each having movable parts with different working faces, to be used with the same molding tool.

In using module 260 having a movable part, a sheet of thermoformable plastic (not shown) may be brought into contact with the interior surface of the molding tool 220 by one or more of air pressure, vacuum, plug assist, or any other suitable method. Movable part 265/236 is actuated to first extend the working face thereof 262 into the interior volume of molding tool 220. The extension of working face 262 into the interior volume of molding tool 220 deforms the thermoformable plastic adjacent to working face 262 to conform to the shape of working face 262. The movable part is then actuated to retract such that working face 262 is at least substantially flush with the interior surface 250 of the molding tool 220, and formed article 10 is extracted from molding tool 220.

Figure 21:
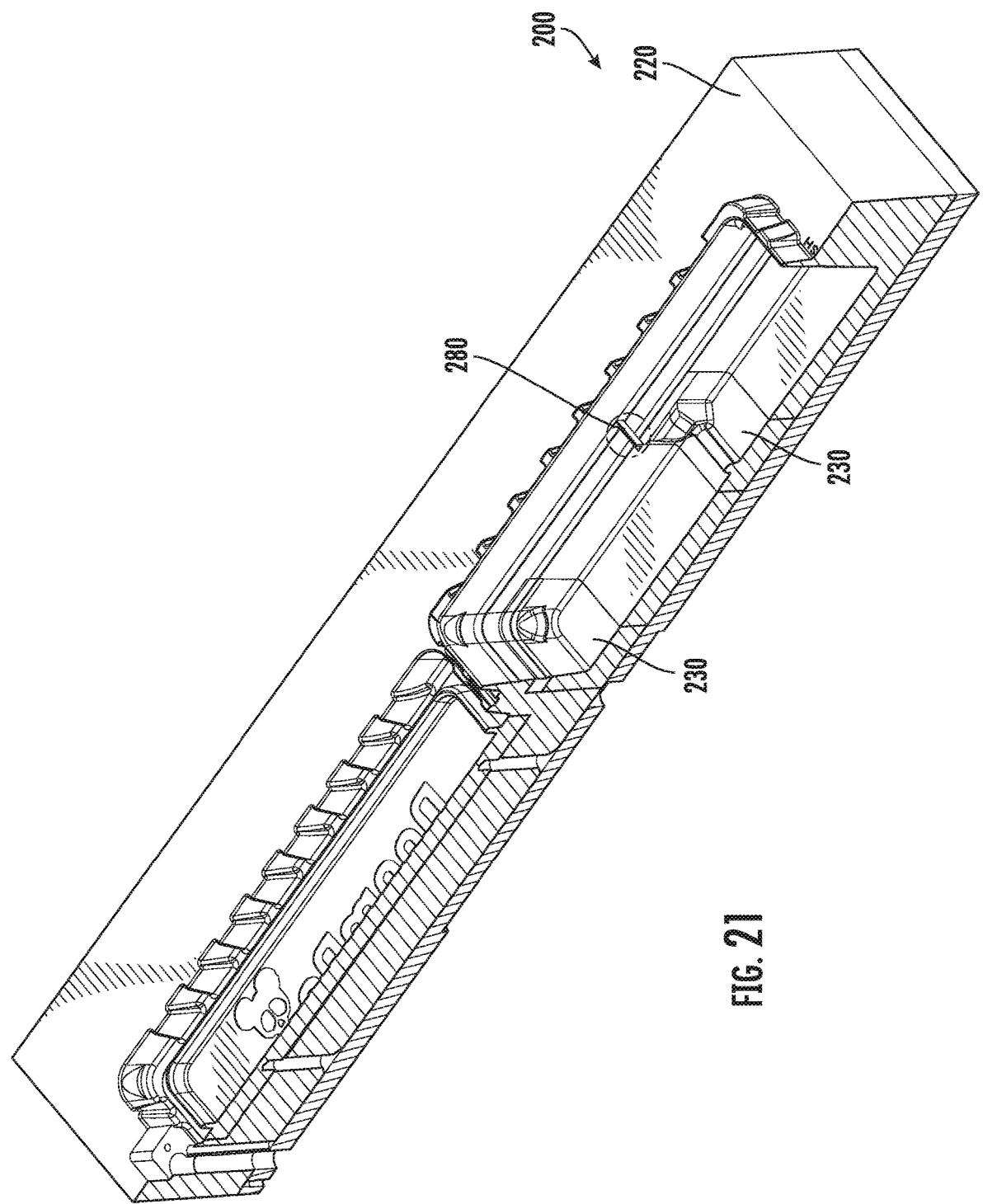
FIG. 21 shows a cut-away view of a molding tool with a retractable feature.
Figure 22:
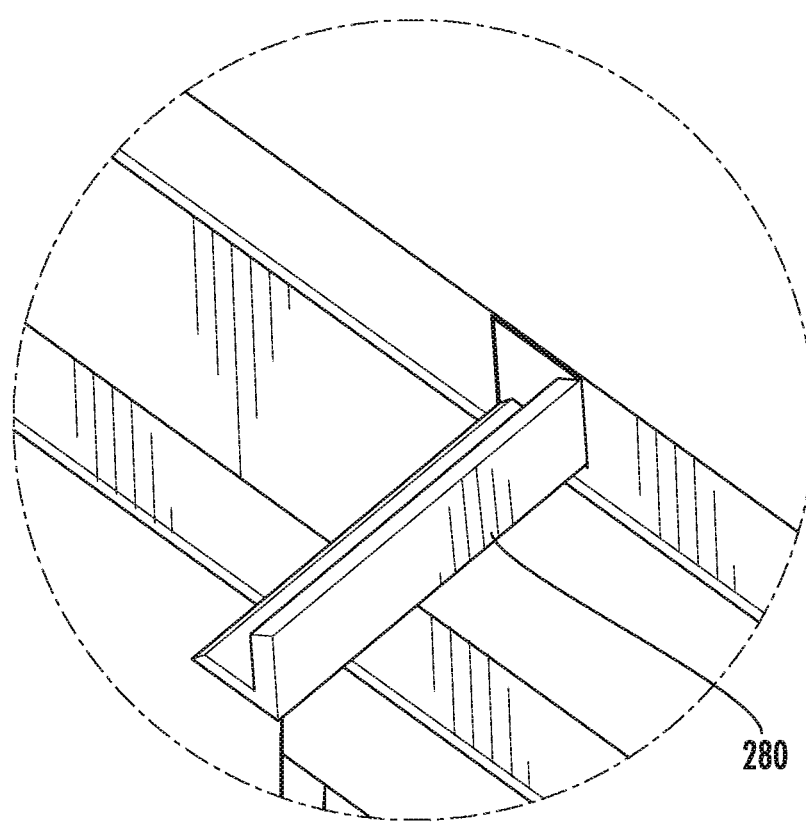
FIG. 22 is an enlarged view of a retractable feature.
Figure 23:
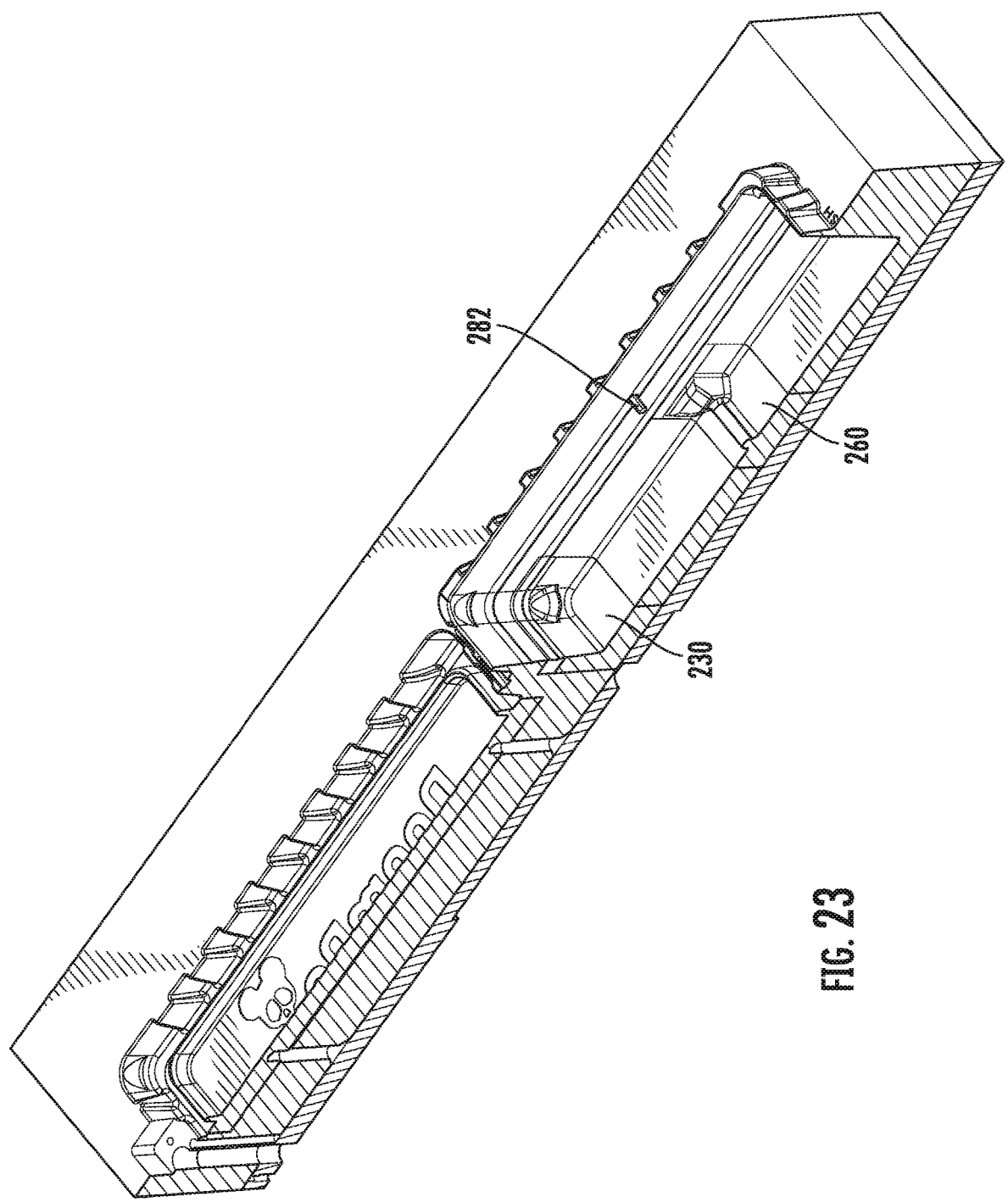
FIG. 23 is a cross-sectional view of a molding tool with a second embodiment of a retractable feature.
Figure 24:
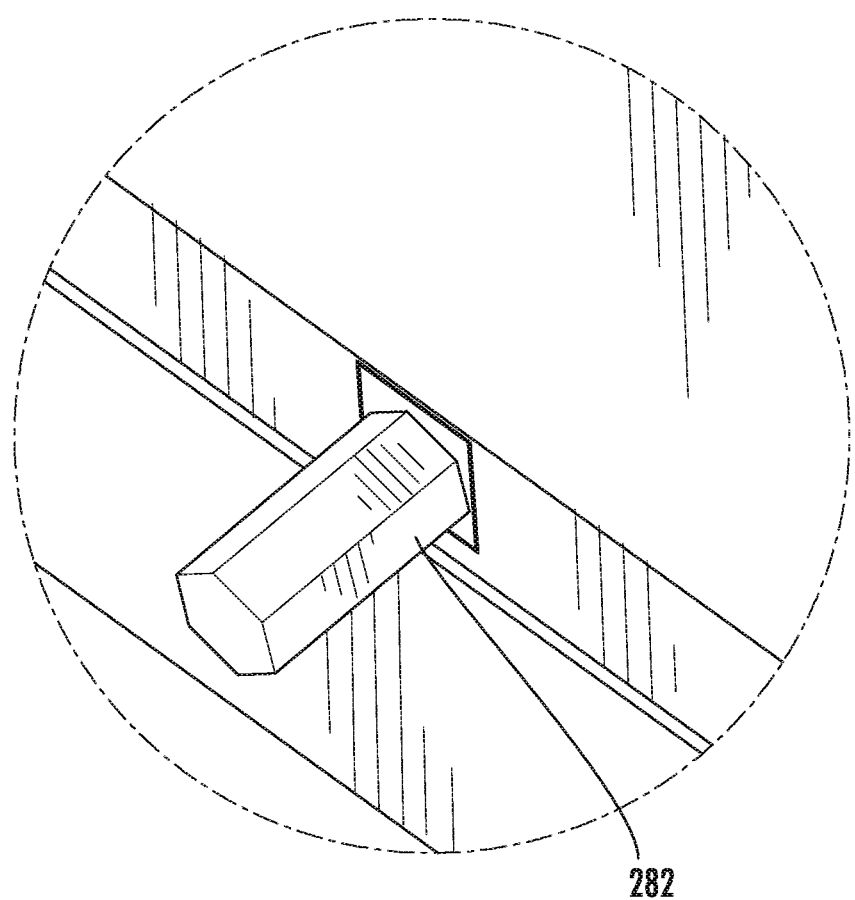
FIG. 24 is an enlarged view of the retractable feature shown in FIG. 23.

FIGS. 21-29 illustrate cross section views of mold apparatus 200 and various retractable parts. FIG. 21 illustrates mold apparatus 200 having modules 230 and 260, along with a retractable feature 280. The retractable feature having a V-shape 280 is shown in an enlarged view in FIG. 22. FIG. 23 illustrates a cross-sectional view of mold apparatus 200 having modules 230 and 260, as well as a retractable feature 282. The retractable feature 282 having a hexagon shape is shown in an enlarged view in FIG. 24.

Figure 25:
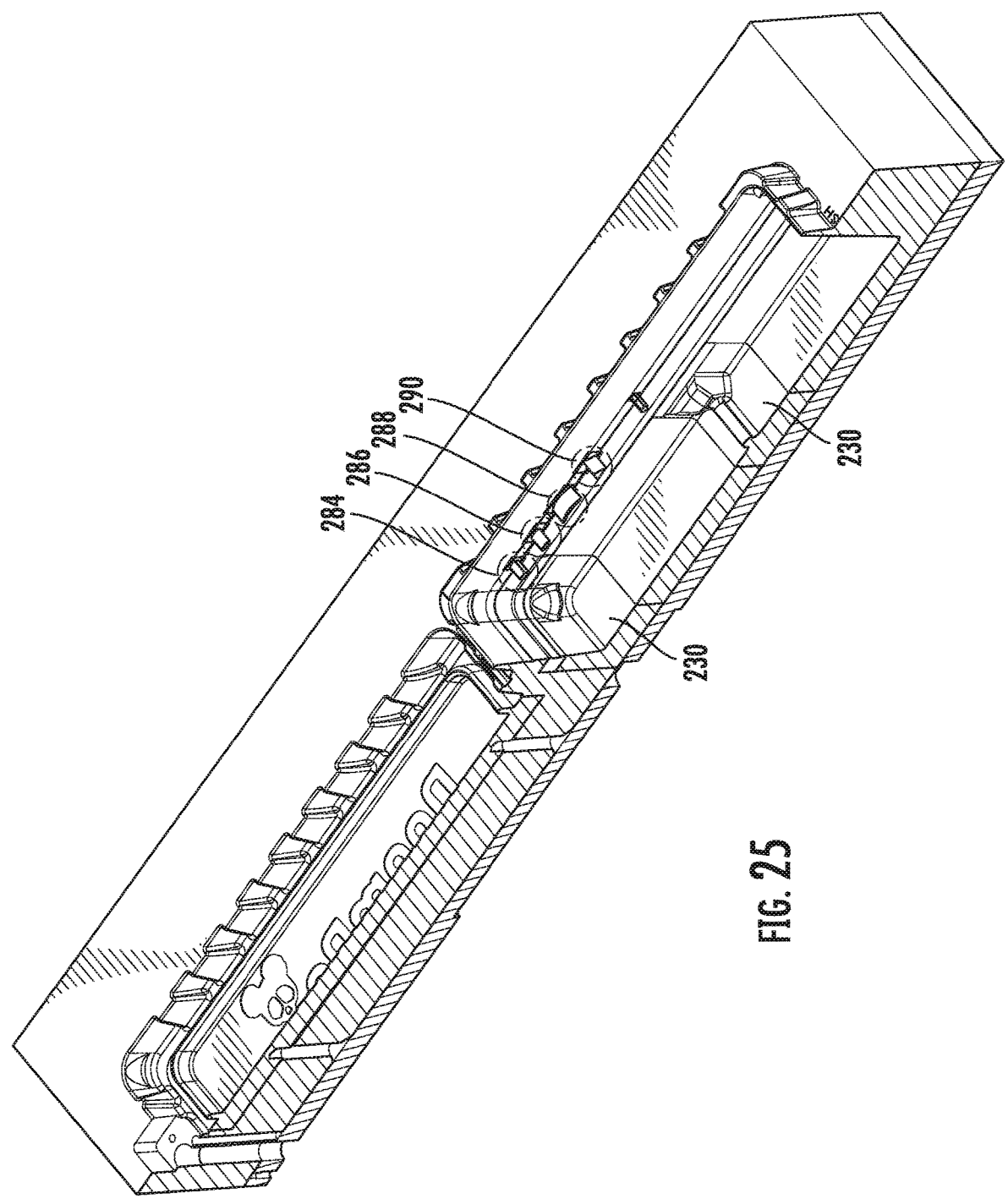
FIG. 25 illustrates a cross-sectional view of a molding tool with a third embodiment of a retractable feature.
Figure 26:
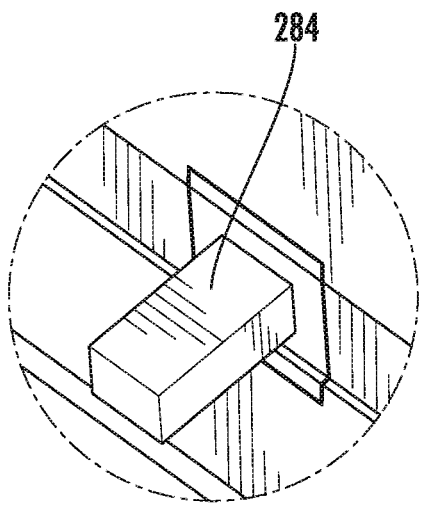
FIG. 26 shows one embodiment of a retractable feature which may be utilized with the disclosed method.
Figure 27:
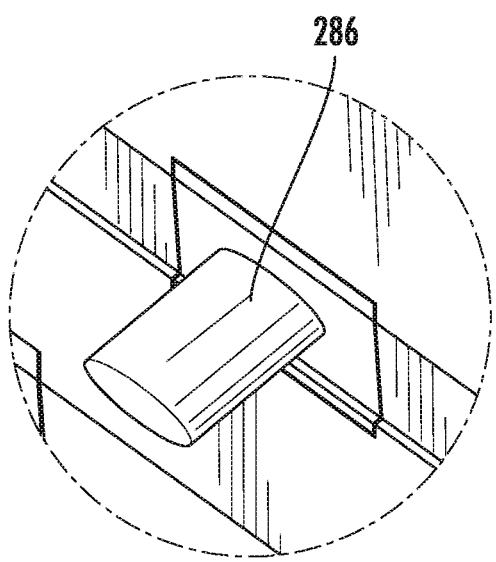
FIG. 27 shows one embodiment of a retractable feature which may be utilized with the disclosed method.
Figure 28:
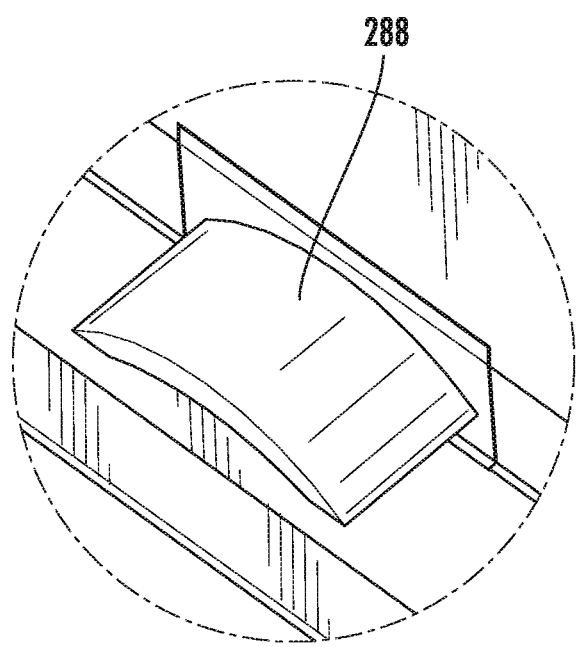
FIG. 28 shows one embodiment of a retractable feature which may be utilized with the disclosed method.
Figure 29:
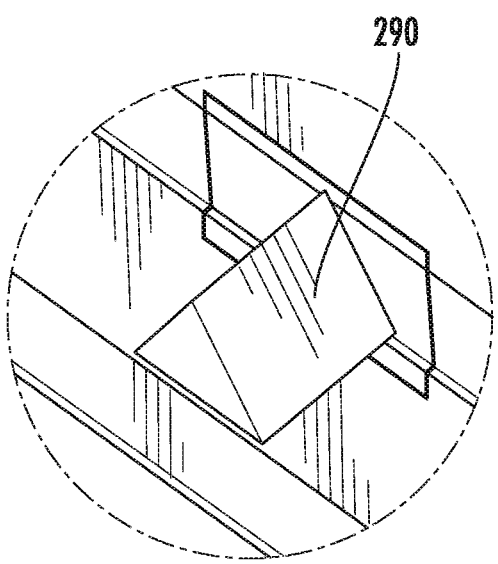
FIG. 29 shows one embodiment of a retractable feature which may be utilized with the disclosed method.

FIG. 25 illustrates a cross-sectional view of mold apparatus 200 having multiple retractable parts 284, 286, 288, and 290. Each of these parts is shown in an enlarged view in FIGS. 26-29. As can be seen from FIGS. 26-29, retractable parts 284, 286, 288, and 290 may comprises a wide variety of shapes including square, rectangular, ellipsoidal, triangular, as well as symmetrical and asymmetrical geometries.

Another important aspect of formed articles described herein with respect to FIG. 5 includes container 10, which may comprise a locking mechanism including apertures 68 and 69 formed within walls 36 and 35. A punch and die mechanism (not shown) is utilized to form apertures 68 and 69. The punch and die may follow the profile of the formed post 67, but with a slightly larger profile to allow for clearance and ease of insertion of the formed posts 67 within apertures 68 and 69. The function of projections or posts 67 and cut-outs or apertures 68, 69 is to prevent the unintentional vertical opening of cover section 50 of packaging container 10. Thus, subsequent to the formation of the thermoplastic sheet in the mold into an article or container, the thermoformed plastic is demolded and then the apertures 68 and 69 are cut out of the thermoformed article/container. In high volume production, the cutting of the aperture feature may occur at a station between a forming station and a die cutting station. It is also in the die cutting station that the planer surfaces of the plastic container are trimmed from the surplus web of material, so that the container can be removed from a remaining perimeter sheet.

Figure 30:
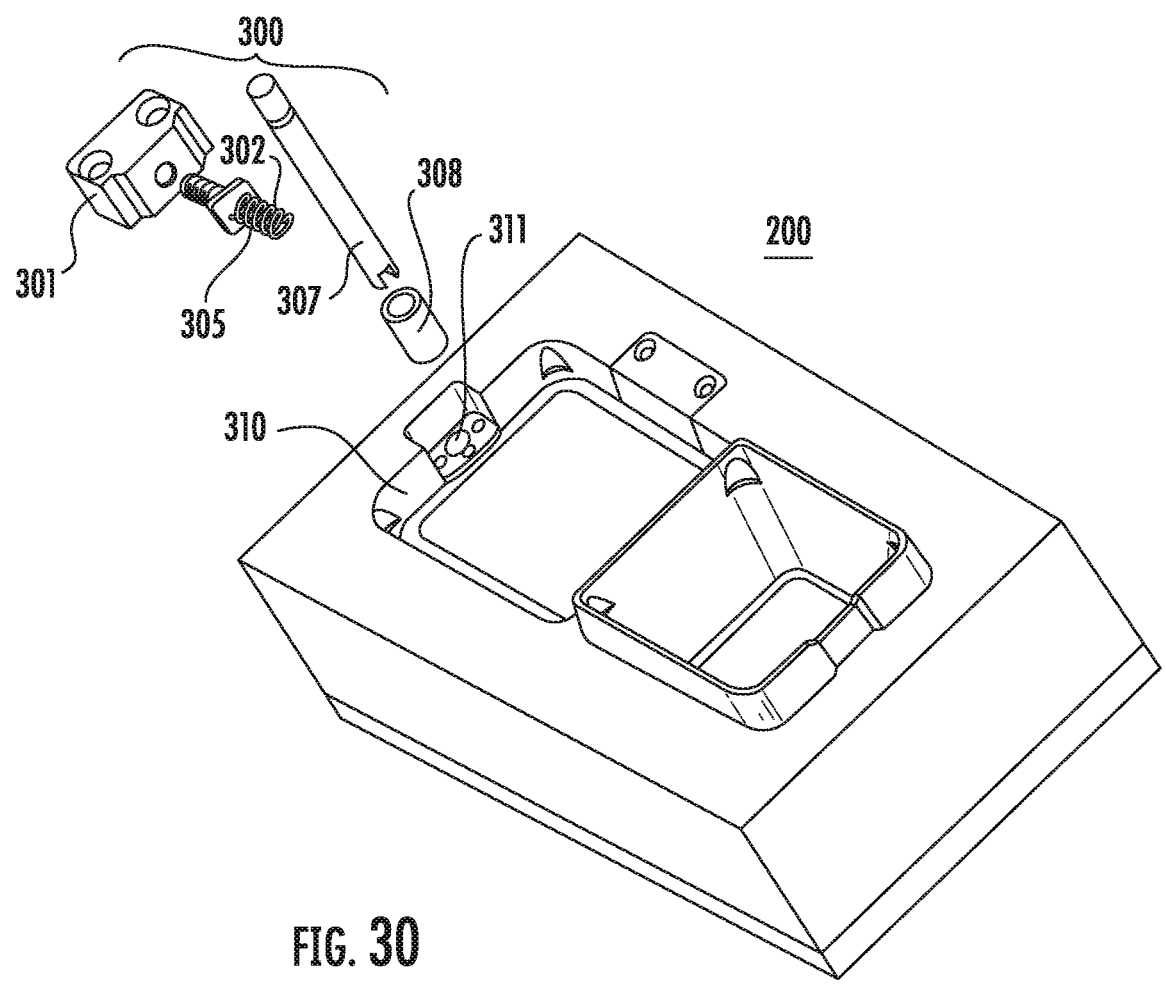
FIG. 30 illustrates a pin assembly which may be utilized to form a post in a container.

Referring to FIG. 30, the molding process also comprises the steps of formation of a post. In particular, the mold apparatus 200 may comprise a pin assembly 300 as shown in FIG. 30. Pin assembly 300 is used to form a post 67 in cover section 50 of container 10 (as shown in FIG. 5). The post 67 is essentially a shaped protrusion, which may be circular, semi-circular, star, square, rectangular, octagonal, or any other geometric shape. The shape and size of the post 67, formed by a pin 305, may vary according to the size and shape of the container 10.

In another embodiment of the present disclosure, post 67 may include a bevel or an angled edge and a top edge. The bevel in the post facilitates moving the post 67 along or past the sidewall of the container to an aperture 42. As shown in FIG. 30, the pin assembly 300 comprises a pin 305 shaped according to the desired shape of the post 67, a spring 302, a pin 305, and a module 301 with one or more holes in the top (two are shown) to secure it in the mold 200, and one or more holes in the front (one is shown) to hold the spring 302 and the pin 305. The spring 302 and the pin 305 are driven by the cam 307 and bushing 308, that are placed into the mold 200 through an opening 311.

The timing of the projection of the pin 305 outbound from the sidewall of the mold may be fine-tuned by being in the fully retracted position prior to the heated plastic sheet entering the mold and being extended just after the plastic sheet has entered the mold 200, but prior to the thermoformed plastic cooling beyond the point where it will be sufficiently flexible to form a post feature around the pin 305.

A pneumatic cylinder (not shown) is connected to the pin assembly 300, wherein the inlet of pressurized air compresses the spring 302 to move the pin 305 out of the pin assembly 300, in extended position so that the post 67 can be formed in the cover section 50 during the molding process. On the other hand, when the pressurized air is released from the pneumatic cylinder, the spring 302 returns back to the home position thereby retracting the pin 305 back into the pin assembly 300.

Further, the impact of the pin 305 on the plastic needs to be controlled for optimal post formation. If the pin 305 moves too fast, the side walls of the post may tear or may develop imperfections such as holes. Also, overly rapid movement of the pin may lead to formation of a post having thin side walls that may fail to provide the strength required for the closure mechanism to work properly and repeatedly. On the other hand, if the pin 305 moves too slowly, the plastic may cool down to a point where it will not deform readily upon impact by the pin 305, and consequently the features of the post 67 may not be well-defined.

The movement of the pin 305 is controlled by the volume of pressurized air. The inlet and outlet for the air (not shown) each have a valve that can be controlled to thereby adjust the amount of air passing through the inlet and outlet. A pneumatic manifold (not shown) is used to route and control the flow of pressurized air to and from the pneumatic cylinder (not shown). The kinetic energy with which the pin 305 impacts the plastic to form the post 67 is controlled through a programmable logic controller (PLC) via the pneumatic cylinder.

After shaping the thermoplastic sheet in the mold, cooling is carried out to reach a stable set point, whereupon the sheet is rigid enough to be removed from the mold without losing the shape of the mold from which it formed. However, before removing the molded sheet from the mold, the extended pin 305 is retracted until the face of the pin 305 is at least substantially flush with the sidewall of the mold. Retraction of pin 305 ensures that pin 305 does not interfere with the formed plastic sheet such that the molded plastic sheet can be removed from the mold. The retraction of the pin 305 is controlled by the pneumatic cylinder as described above.

Further, the molded sheet is withdrawn in the opposite direction from which it entered the mold. Typically, the sheet enters the mold and is removed from the mold in a vertical fashion. After removing the sheet from the forming station, it is fed into the punching stage.

Figure 31:
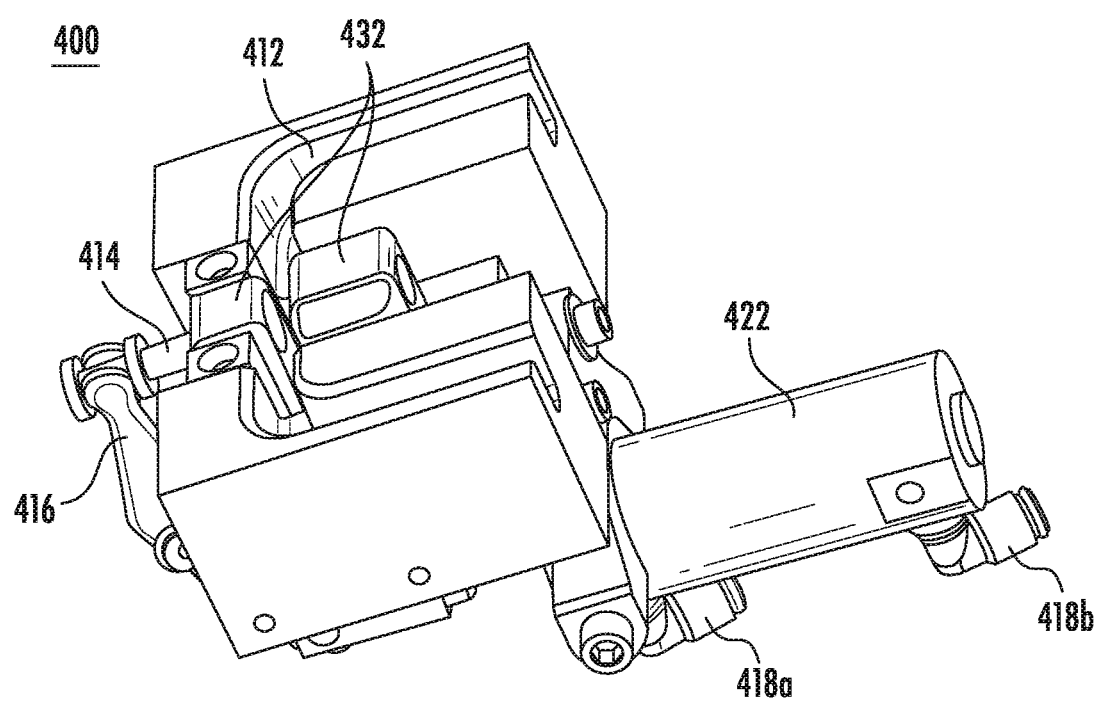
FIG. 31 illustrates a punching apparatus which may be utilized to form an aperture in a container.
Figure 32:
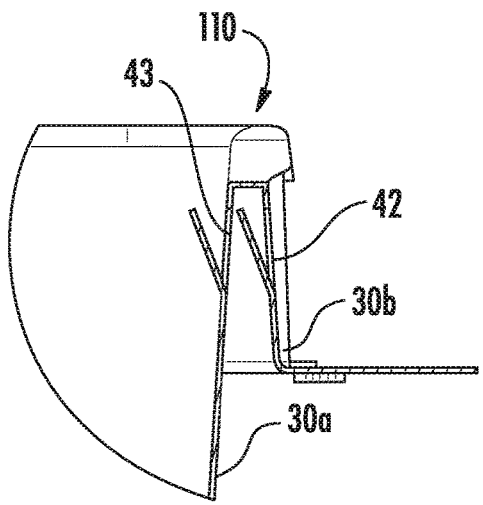
FIG. 32 provides a magnified side view of an aperture formed in a container.
Figure 33:
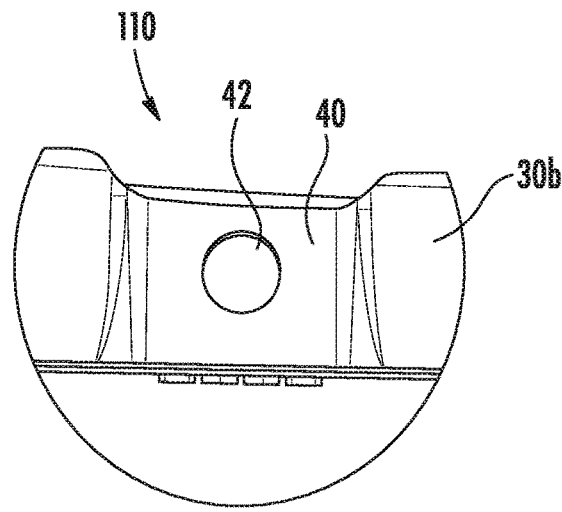
FIG. 33 shows a magnified front view of an aperture formed in a container.

Referring to FIG. 31-34, after molding the plastic sheet into the desired shape, the molded container reaches a punching stage. The punching process is used for forming aperture 42 (as illustrated in FIG. 33), which is a cut-out in the base section 20 of the packaging container 10, to receive the post 67 formed in cover section 50 of the container 10. The punching stage comprises a punching station 400 and a hold down plate (not shown). The hold-down plate is positioned opposite to the punching tool and helps to hold the containers in place during the punch process. The punching station 400 (as illustrated in FIG. 31) comprises a fixture 412 to hold the container, a punch 414 which is used to create the aperture in the base section 20, a lever arm 416 to hold/move the punch 414, and air fittings 418*a* and 418*b* to let pressurized air into and out of the pneumatic cylinder 422 to drive the punch 414 with the help of the lever arm 416.

The punching station 400 moves up to engage the sheet of formed containers, along with the "hold-down" tool (not shown) that descends from above the sheet to help hold the containers in place during the punch process. The hold-down tool comprises plates may take the form of vertical bars which go in-between the container shapes, so as not to distort or crush them. The fixture 412 of the punching station 400 holds the shape of the container to carry forward the punch and die process. The pressurized air from the pneumatic cylinder 422 pushes the lever arm 416 to drive the punch 414 into the plastic container. The die 432 is fixed along the two side walls of the base section of the plastic container. After punching into the container, the punch 414 retracts back as the pressurized air comes out of the pneumatic cylinder 422. Release of air allows the lever arm 416 to move in the reverse direction, taking out the punch 414 from the die 432, followed by lowering down of the punching station 400.

Figure 34:
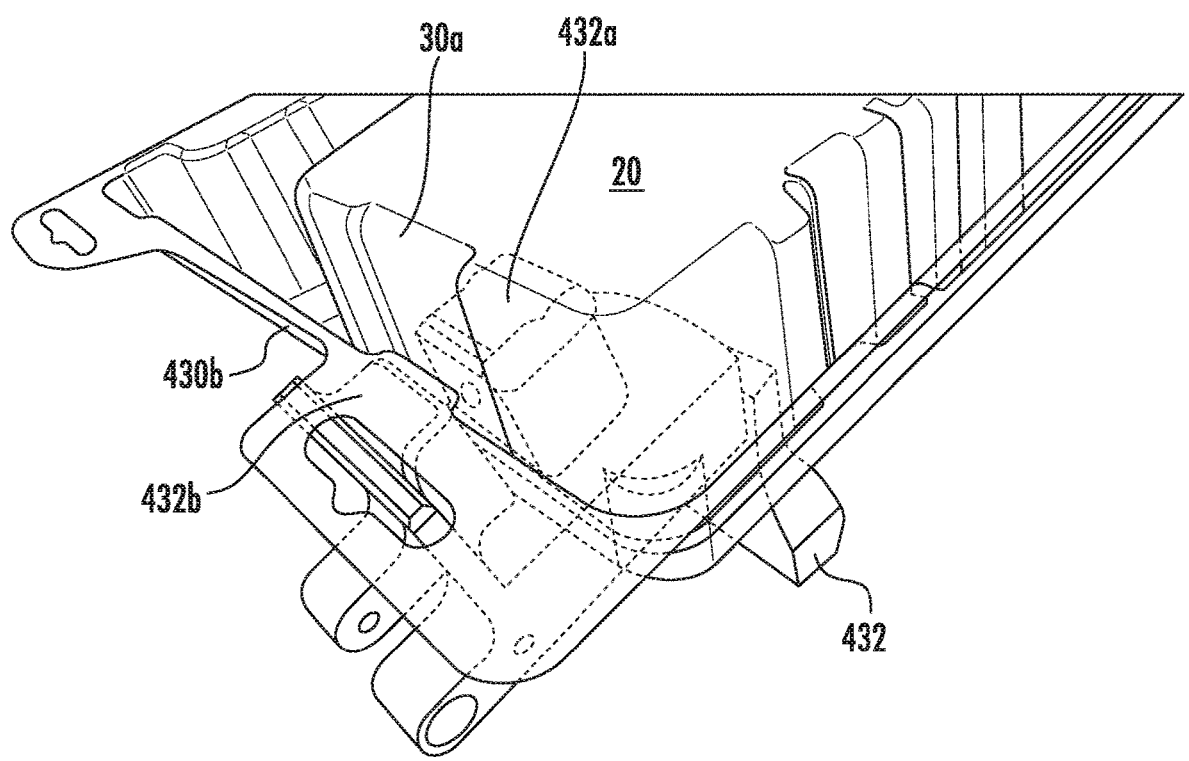
FIG. 34 illustrates a die fixed along side walls of a container.

FIG. 34 illustrates the die 432 fixed along the side walls of the base section 20. Elements 432*a* and 432*b* are the parts of the die placed adjacent to outer base end wall 36 and inner base end wall 35. Die portion 432*a* and 432*b* are spaced apart in such a way that the impact of the punch may pierce or penetrate the double side walls of the base section to make apertures 42 and 43, as shown in FIGS. 32 and 33.

The movement of the punch 414 is controlled by the volume of the pressurized air flowing in and out of pneumatic cylinder 422. The volume of air is measured as cubic feet per minute (CFM). Each of the air inlet and air outlets has an air fitting valve 418*a* and 418*b* allowing the volume of air to be controlled a in proportion to the amount the valve is open. For example, a valve may be opened to a value of 10 percent, meaning it is one-tenth of the way to being fully open. A pneumatic manifold (not shown) is used to route and control the flow of pressurized air to and from the pneumatic cylinder 422. The system of controlling the volume of pressurized air in the pneumatic cylinder 422 is operated to control the kinetic energy with which the punch 414 impacts the plastic to form the apertures 68 and 69, through a programmable logic controller, or PLC.

In other embodiments of the present disclosure, the mechanism to control the pin assembly for post formation and/or the punching stage for aperture formation may include, but is not limited to, hydraulic, electronic motor, servo motor, stepper motor, linear actuator, and piezoelectric actuator. The apertures 68 and 69 formed by the process described in the embodiments of the present disclosure may be partial cut-outs or complete holes of any geometric shape including, not limited to, circular, semi-circular, star, square, rectangular, octagonal, or any other shape compatible with the shape of the post formed in the cover section so as to enable the closure and release mechanism to operate efficiently.

In another embodiment of the present disclosure, the aforementioned clam shell locking arrangement of the container may be reversed. In particular, post 67 may be present in the base section 20 instead of cover section 50, and formed to be inserted in the aperture 68 and 69 in the cover section 50 of the container. In yet another embodiment of the present disclosure, the container 10 may contain one or more locking arrangements for a more secure closing mechanism during transportation, packaging, traveling, etc. For example, there may be multiple post and aperture arrangements on the side walls of the container.

After the punching stage, the container moves to the trimming stage. The trimming stage employs a die cutting station to trim off the unused portion of the plastic sheet, with the help of trimmers placed in the trimming station (not shown). Trimmers cut out the molded containers from the plastic sheet, which are pushed out to separate them from the remaining plastic sheet. The remaining plastic sheet or the web is further bound on a spool to be reground or, alternatively, either blended with the raw material for making new sheet or sold as scrap.

During the trimming stage, laterally extending flange 45 and peripheral flange 70 (as illustrated in FIGS. 4 and 5) are formed. Laterally extending flange 45 is deformable, such that when laterally extending flange 45 is depressed in a region adjacent to depression 40 (as illustrated in FIG. 3) and outer wall segment 36 is simultaneously pushed inward, post 67 is released from apertures 68 and 69, thereby opening packaging container 10. Laterally extending flange 45, though deformable, is sufficiently resistant to deformation to return to its non-depressed shape when it is no longer depressed.

Figure 35:
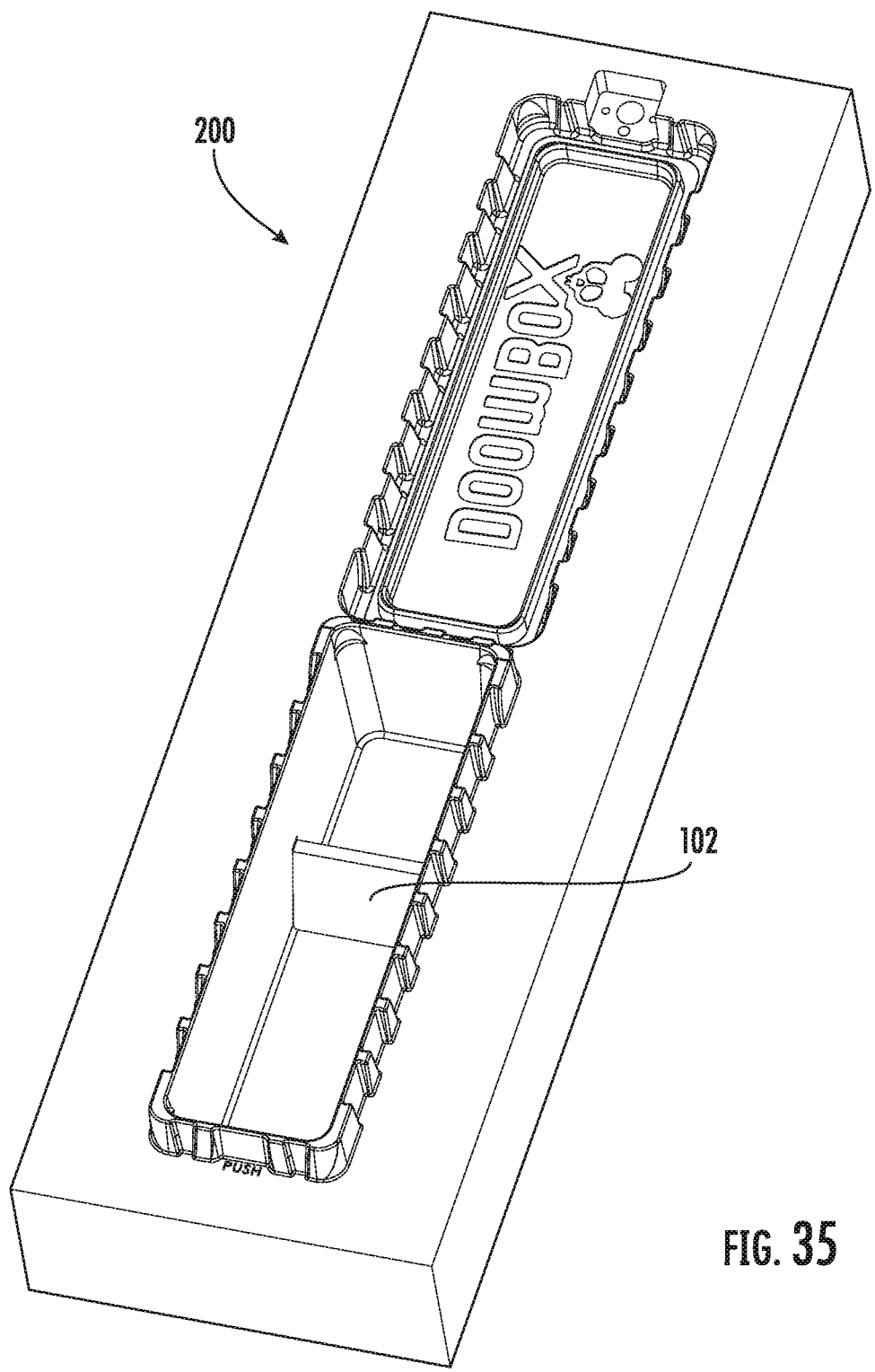
FIG. 35 shows an additional embodiment of a molding tool having a raised divider for forming features in a container.
Figure 36:
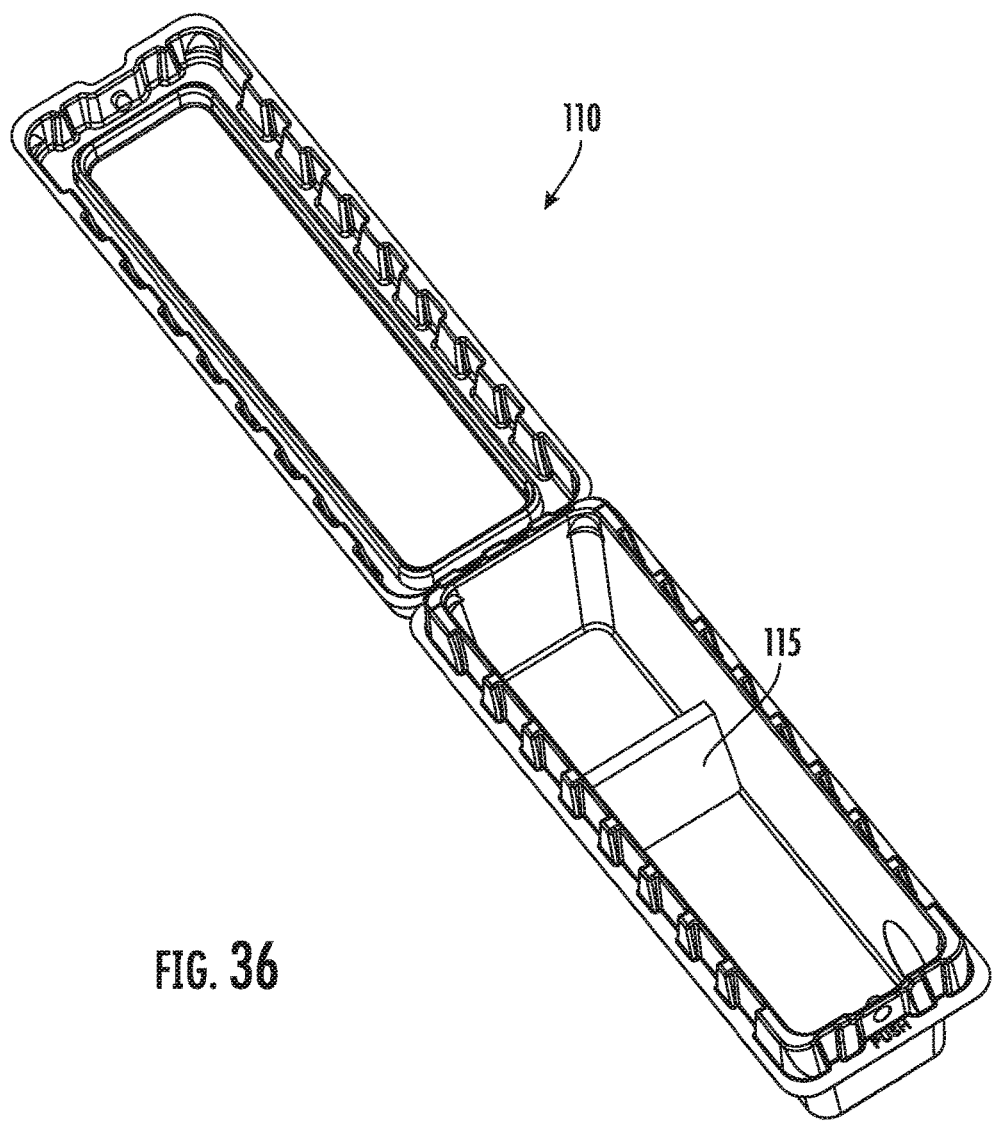
FIG. 36 is a perspective view of a container formed with a divider.
Figure 37:
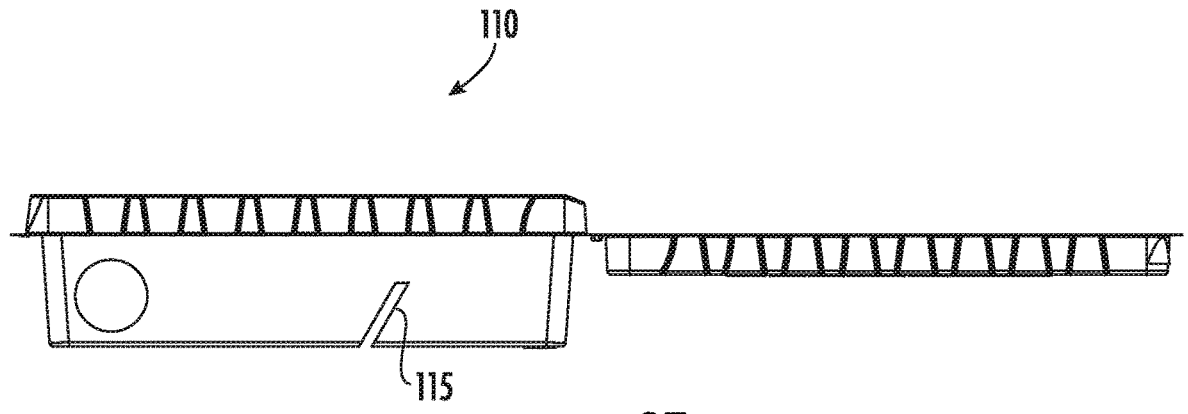
FIG. 37 is a side view of a container formed with a divider.

Although the present disclosure has been described in terms of certain preferred embodiments, various features of separate embodiments can be combined to form additional embodiments not expressly described. Moreover, other embodiments apparent to those of ordinary skill in the art after reading this disclosure are also within the scope of this disclosure. For example, the mold 200 may include a raised divider 102 as shown in FIG. 35 for forming container 110 having divider 115, as shown in perspective and side views of FIGS. 36 and 37. Furthermore, not all of the features, aspects and advantages are necessarily required to practice the present disclosure. Thus, while the above detailed description has shown, described, and pointed out novel features of the disclosure as applied to various embodiments, it will be understood that various omissions, substitutions, and changes in the form and details of the apparatus or process illustrated may be made by those of ordinary skill in the technology without departing from the spirit of the disclosure. The disclosures may be embodied in other specific forms not explicitly described herein. The embodiments described above are to be considered in all respects as illustrative only and not restrictive in any manner.

We claim:

1. A method for thermoforming a container, the container having a base section and a cover section connected by a hinged portion, the base section having an outer wall segment at least partially surrounding a perimeter of the base section and the cover section having an inner wall segment at least partially surrounding a perimeter of the cover section, a plurality of protrusions formed in the outer wall segment of the base section and a plurality of indentations formed in the inner wall segment of the cover section, the plurality of arcuate protrusions of the base section engaging the plurality of arcuate indentations of the cover section, said method comprising:
   A. heating a sheet of thermoplastic material to form a heated flexible sheet;
   B. transferring the heated flexible sheet to a mold, the mold having:
      a width, a height, an interior volume, one or more walls, and a floor,
      a pre-formed shape of a base section comprising a bottom surface and spaced apart inner and outer wall segments, the outer wall segment including a plurality of indentations for forming the protrusions on the outer wall of the container base section,
      a pre-formed shape of a cover section comprising a top surface and spaced apart inner and outer wall segments, the inner wall segment including a plurality of protrusions for forming the indentations on the inner wall of the container cover section,
      a channel positioned between the base section and the cover section of the packaging container;
      and at least one module having a moving part and a working face, the module being attached to an aperture in the floor of the mold;
   C. causing the heated flexible sheet to come at least substantially into contact with the walls and floor of the mold;
   D. actuating the moving part such that the working face thereof extends into the heated flexible sheet and the interior volume of the mold to form a projection in the heated flexible sheet;
   E. cooling the heated flexible sheet to form a container that is rigid enough to be removed from the mold without losing the shape of the mold;
   F. actuating the moving part in order to retract the working face from the interior volume of the mold; and G. extracting the container from the mold, wherein the projection acts as a retaining member for retaining an object within the container.

2. The method of thermoforming a container of claim 1, wherein the plurality of indentations and plurality of protrusions of the mold are arcuate.

3. The method of thermoforming a container of claim 2, wherein the projection is arcuate.

4. The method of thermoforming a container of 1, wherein the base has a base rim and the cover has a cover rim and the projection is formed in the base rim and cover rim.

5. The method of thermoforming a container of 1, wherein the base has a floor and the projection is formed in the floor.

6. The method of thermoforming a container of claim 1, wherein the working face of the moving part may comprise a plurality of shapes.

7. The method of thermoforming a container of claim 1, wherein the working face of the moving part may comprise a plurality of sizes.

8. The method of thermoforming a container of claim 1, wherein the working face of the moving part may be positioned at any location within the interior volume of the mold including the floor or walls of the mold.

9. The method of thermoforming a container of claim 1, wherein the module may contain a plurality of moving parts each having a working face.

10. The method of thermoforming a container of claim 1, wherein the method may utilize a plurality of modules each having moveable parts with different working faces.

11. The method of thermoforming a container of claim 10, wherein the module may be attached at an end wall of the mold.

12. The method of thermoforming a container of claim 1, wherein the mold comprises a plurality of apertures for attaching modules thereto.

13. The method of thermoforming a container of claim 1, wherein the module is removably secured to the mold.

14. The method of thermoforming a container of claim 1, wherein the module may be attached at any point along the walls of the mold.

15. The method of thermoforming a container of claim 1, wherein the module may extend at least substantially over an entire wall of the mold.

16. The method of thermoforming a container of claim 1, wherein the module may extend at least substantially over an end wall, a side wall, or the floor of the mold.

17. The method of thermoforming a container of claim 1, wherein the module is the same width as the mold but only a fraction of the height of the mold.

18. The method of thermoforming a container of claim 1, wherein the module is attached to an aperture in a wall of the mold.

19. A method for thermoforming a container, said method comprising:
  A. heating a sheet of thermoplastic material to form a heated flexible sheet;
  B. transferring the heated flexible sheet to a mold, the mold having:
    a width, a height, an interior volume, one or more walls, and a floor,
    a pre-formed shape of a base section comprising a bottom surface and spaced apart inner and outer wall segments, the outer wall segment including a plurality of indentations for forming the protrusions on the outer wall of the container base section,
    a pre-formed shape of a cover section comprising a top surface and spaced apart inner and outer wall segments, the inner wall segment including a plurality of protrusions for forming the indentations on the inner wall of the container cover section;
  C. causing the heated flexible sheet to come at least substantially into contact with the walls and floor of the mold;
  D. actuating a moving part attached to a module in the floor of the mold such that a working face thereof extends into the heated flexible sheet and the interior volume of the mold to form a projection in the heated flexible sheet;
  E. cooling the heated flexible sheet to form a container that is rigid enough to be removed from the mold without losing the shape of the mold;
  F. actuating the moving part in order to retract the working face from the interior volume of the mold; and
  G. extracting the container from the mold, wherein the projection acts as a retaining member for retaining an object within the container.

* * * * *